United States Patent
Modi et al.

(10) Patent No.: US 10,990,067 B2
(45) Date of Patent: Apr. 27, 2021

(54) COMPUTER SYSTEM AND METHOD FOR THE DYNAMIC CONSTRUCTION AND ONLINE DEPLOYMENT OF AN OPERATION-CENTRIC FIRST-PRINCIPLES PROCESS MODEL FOR PREDICTIVE ANALYTICS

(71) Applicant: Aspen Technology, Inc., Bedford, MA (US)

(72) Inventors: Ajay Modi, Newton, MA (US); Ashok Rao, Sugar Land, TX (US); Thomas W. S. Lewis, Waltham, MA (US); Mikhail Noskov, Acton, MA (US); Sheng Hua Zheng, Shanghai (CN); Willie K. C. Chan, Framingham, MA (US)

(73) Assignee: Aspen Technology, Inc., Bedford, MA (US)

( * ) Notice: Subject to any disclaimer, the term of this patent is extended or adjusted under 35 U.S.C. 154(b) by 0 days.

(21) Appl. No.: 16/308,190

(22) PCT Filed: Jul. 5, 2017

(86) PCT No.: PCT/US2017/040725
§ 371 (c)(1),
(2) Date: Dec. 7, 2018

(87) PCT Pub. No.: WO2018/009546
PCT Pub. Date: Jan. 11, 2018

(65) Prior Publication Data
US 2019/0179271 A1 Jun. 13, 2019

Related U.S. Application Data

(60) Provisional application No. 62/359,379, filed on Jul. 7, 2016.

(51) Int. Cl.
*G05B 13/04* (2006.01)
*G05B 17/02* (2006.01)

(52) U.S. Cl.
CPC ........... *G05B 13/048* (2013.01); *G05B 17/02* (2013.01)

(58) Field of Classification Search
CPC ...................................... G05B 17/02
(Continued)

(56) References Cited

U.S. PATENT DOCUMENTS 6,088,630 A    7/2000  Cawlfield
9,046,881 B2 *  6/2015  Blevins .............. G05B 19/0428
(Continued)

FOREIGN PATENT DOCUMENTS

JP    2009-509217 A    3/2009
JP    2011-054163 A    3/2011
(Continued)

OTHER PUBLICATIONS

International Search Report and Written Opinion for PCT/US2017/040725 dated Oct. 16, 2017., entitled "Computer System and Method for the Dynamic Construction and Online Deployment of an Operation-Centric First-Principles Process Model for Predictive Analytics".

(Continued)

*Primary Examiner* — Md Azad
(74) *Attorney, Agent, or Firm* — Hamilton, Brook, Smith & Reynolds, P.C.

(57) ABSTRACT

Computer-implemented methods and systems construct a calibrated operation-centric first-principles model suitable for online deployment to monitor, predict, and control real-time plant operations. The methods and systems identify a plant-wide first-principles model configured for offline use and select a modeled operating unit contained in the (Continued)

plant-wide model. The methods and systems convert the plant-wide model to an operation-centric first-principles model of the selected modeled operating unit. The methods and systems recalibrate the operation-centric model to function using real-time measurements collected by physical instruments of the operating unit at the plant. The recalibration may include reconciling flow and temperature, estimating feed compositions, and tuning liquid and vapor traffic flow in the model. The methods and systems deploy the operation-centric model to calculate KPIs (Key Performance Indicators) using real-time measurements. A processor employs the KPIs and automatically predicts and controls behavior of the physical operating unit at the plant.

22 Claims, 13 Drawing Sheets

(58) Field of Classification Search
USPC .......................................................... 700/44
See application file for complete search history.

(56) References Cited

U.S. PATENT DOCUMENTS

| | | | |
|---|---|---|---|
| 9,141,911 | B2 | 9/2015 | Zhao |
| 9,535,808 | B2 | 1/2017 | Bates |
| 10,114,367 | B2 | 10/2018 | Bates |
| 2011/0320386 | A1* | 12/2011 | Liano .................. G05B 11/32 706/12 |
| 2012/0221124 | A1* | 8/2012 | Thiele .................. G05B 13/042 700/31 |
| 2013/0191106 | A1* | 7/2013 | Kephart .................. G06F 30/20 703/21 |
| 2013/0246316 | A1* | 9/2013 | Zhao .................... G05B 13/048 706/11 |
| 2013/0338842 | A1 | 12/2013 | Inoue et al. |
| 2016/0171414 | A1* | 6/2016 | Lee .................. G06Q 10/06393 705/7.39 |
| 2016/0320768 | A1 | 11/2016 | Zhao |
| 2017/0308802 | A1 | 10/2017 | Ramsøy et al. |
| 2018/0019910 | A1 | 1/2018 | Tsagkaris et al. |
| 2018/0157225 | A1 | 6/2018 | Dave et al. |
| 2019/0179271 | A1 | 6/2019 | Modi et al. |
| 2020/0379442 | A1 | 12/2020 | Chan |
| 2020/0387818 | A1 | 12/2020 | Chan |

FOREIGN PATENT DOCUMENTS

| | | |
|---|---|---|
| JP | 2013535730 A | 7/2011 |
| JP | 2019521444 A | 7/2019 |
| WO | 2012118067 A1 | 2/2012 |
| WO | 2012012723 A2 | 7/2012 |
| WO | 2015149928 A2 | 10/2015 |
| WO | 2016093960 A1 | 6/2016 |
| WO | 2018009546 A1 | 1/2018 |
| WO | 2018075995 A1 | 4/2018 |
| WO | 2018223000 A1 | 12/2018 |
| WO | 2020227383 A1 | 11/2020 |
| WO | 2020247204 A1 | 12/2020 |

OTHER PUBLICATIONS

Pantelides C. C, et al., "The online use of first-principles models in process operations: Review, current status and future needs", Computers & Chemical Engineering, vol. 51, ISSN: 0098-1354, pp. 136-148 (2013).
Bhutani, N., et al, "First-Principles, Data-Based, and Hybrid Modeling and Optimization of an Industrial Hydrocracking Unit", Ind. Eng. Chem. Res., 45 (23), pp. 7807-7816 (2006).
Hebert, D., "First-Principle Vs Data-Driven Models—Cost and the Time and Skill Required to Develop an Application-Specific Model have Been Barriers to Using First-Principle Modeling Tools". http://www.controlglobal.com/articles/2008/200/ (2008).
Random Forest Regressor, http://scikit-learn.org/stable/modules/generated/sklearn.ensemble.RandomForestRegressor.html (2010).
Machine Learning in Python, http://dl.acm.org/citation.cfm?id=2078195 (2011).
S. Joe and F. Y. Kuo, Remark on Algorithm 659: Implementing Sobol's quasirandom sequence generator, ACM Trans. Math. Softw. 29, 49-57 (2003).
http://web.maths.unsw.edu.au/~fkuo/sobol/ (2010).
Kister, Distillation Operation (Mechanical-Engineering), Bookmart Press, Inc., p. 376, 1990.
Rakthanmanon, "Searching and Mining Trillions of Time Series Subsequences under Dynamic Time Warping," the 18th ACM SIGKDD Conference on Knowledge discovery and Data Mining, Aug. 12-16, 2012.
Silver, D., et al., "Mastering the game of Go with deep neural networks and tree search", Nature 2016; 529:484-489.
Silver, D., et al., "Mastering chess and shogi by self-play with a general reinforcement learning algorithm", arXiv:1712.01815v1 [cs.AI] Dec. 5, 2017.
Venkatasubramanian, V., "The Promise of Artificial Intelligence in Chemical Engineering: Is It Here, Finally?" AIChE Journal, vol. 65-2, pp. 467-479, Dec. 19, 2018.
Kister, H.Z. and Haas, J.R., "Predict entrainment flooding on sieve and valve trays," Chemical Engineering Progress, 86(9), p. 63, 1990.
Fair, J.R. and Mathews, R.L., "How to predict sieve tray entrainment and flooding," Petro/Chem Engineer 33(10), p. 45, 1961.
Brill, et al., "Transportation of liquids in multiphase pipelines under low liquid loading conditions," Ph.D. Dissertation, The University of Tulsa (1995).
Caetano, "Upward vertical two-phase flow through an annulus," Ph.D. Dissertation, The University of Tulsa (1985).
Psichogios, D.C. and Ungar, L. H., "A Hybrid Neural Network—First Principles Approach to Process Modeling," AIChE Journal, 38: 1499-1511 (1992).
U.S. Appl. No. 16/434,793, filed Jun. 7, 2019, titled: "Asset Optimization Using Integrated Modeling, Optimization, and Artificial Intelligence", Willie K. C. Chan et al.
Yang, "A study of intermittent flow in downward inclined pipes," Ph.D. Dissertation, The University of Tulsa (1996).
Zendehboudi et al.., "Applications of hybrid models in chemical, petroleum, and energy systems: A systematic review," Applied Energy, 228: 2539-2566 (2018).
Zhang et al., "Unified model for gas-liquid pipe flow via slug dynamics—Part 1: Model development," Trans. of the ASME, 25: 266-273 (2003).
Zhang et al., "Unified model for gas-liquid pipe flow via slug dynamics—Part 2: Model validation," Trans. of the ASME, 25: 274-283 (2003).
Hussein, "Adaptive Artificial Neural Network-Based Models for Instantaneous Power Estimation Enhancement in Electric Vehicles' Li-Ion Batteries", IEEE Transactions on Industry Applications, vol. 55, No. 1, Jan. 1, 2019, 840-849, XP011700440.
Potocnik P, et al, "Neural Net Based Hybrid Modeling of the Methanol Synthesis Process", Neural Processing Letters, Kluwer Academic Publishers, No. 3, Jan. 1, 2000, 219-228. XP000949966.
Yang, et al, "An integrated multi-task control system for fuel-cell power plants", Decision and Control and European Control Conference (CDC-ECC), 2011 50th IEEE Conference, Dec. 12, 2011, 2988-2993.
U.S. Appl. No. 16/868,183, filed May 6, 2020, titled: "Combining Machine Learning With Domain Knowledge and First Principles for Modeling in the Process Industries", Willie K. C. Chan et al.
International Search Report and Written Opinion for PCT/US2020/031636 dated Jul. 15, 2020, entitled "Combining Machine Learning With Domain Knowledge and First Principles for Modeling in the Process Industries".
International Search Report and Written Opinion for PCT/US2020/034530 dated Jul. 24, 2020, entitled "Asset Optimization Using Integrated Modeling, Optimization, and Artificial Intelligence".

(56) References Cited

OTHER PUBLICATIONS

International Search Report and Written Opinion for PCT/US2020/055787 dated Jan. 29, 2021, entitled "System and Methods for Automated Model Development From Plant Historical Data for Advanced Process Control".

* cited by examiner

COMPUTER SYSTEM AND METHOD FOR THE DYNAMIC CONSTRUCTION AND ONLINE DEPLOYMENT OF AN OPERATION-CENTRIC FIRST-PRINCIPLES PROCESS MODEL FOR PREDICTIVE ANALYTICS

RELATED APPLICATION

This application is the U.S. National Stage of International Application No. PCT/US2017/040725, filed Jul. 5, 2017, which designates the U.S., published in English, and claims the benefit of U.S. Provisional Application No. 62/359,379, filed on Jul. 7, 2016. The entire teachings of the above applications are incorporated herein by reference in their entirety.

BACKGROUND

In the process industry, safe and sustainable plant operations, low economic cost, and high operational efficiency have long been goals of performing asset optimization. Process models can serve an important function in assisting plant engineers and operators in optimizing plants operations to meet such desirable goals. The use of process models to drive the complex decision-making required in the process industry is well established. Process models offer many advantages in this complex decision-making, such as helping to organize and structure the vast quantity of plant data being processed, directly relating system outputs to system inputs, offering transparency in functionality, and maintaining explicit representations of their domain.

Most process models can be grouped into one of two major classes: (1) empirical (black-box) models that are usually derived from plant measurements, and (2) first-principles models that encapsulate fundamental physical, chemical, and thermodynamic principles and laws. First-principles models possess many advantages over black-box models. For example, first-principles models are more rigorous, have more predictive power, better handle nonlinearities in the modeled process, and are more reliable in extrapolating into regions beyond their original scope of model construction.

In spite of their many advantages, first-principles models have not been widely used in the process industry to drive the real-time decision making required to operate a plant. Rather, most first-principles models are typically developed for offline uses, such as process design and rating. First-principles models developed for such offline uses are often ill-suited for online use. For example, these offline models are not structured to support easy calibration, lack instrumentation information, and do not reflect the control or operating objectives of the plant operations, as required for online model use. For further example, these offline models are not aligned with the physical dimensions of the actual (physical) plant equipment that they represent, are not designed for multiple modes of operation, and are not amenable to quick solutions by a modeling algorithm, as also required for online model use.

In the process industry, one type of online application that may use a first-principles model is real-time optimization (RTO). In this application, the focus is typically on plant-wide operations, and the goal is usually to make process adjustments that enable the whole plant to reach an optimal steady-state. For this application, a first-principle model may be suitable because the resolution needed for the application is relatively low since a wide operating range is required for the application. In contrast, for an operation-centric (single unit operations) application, a first-principles model is typically not suitable because the application requires high fidelity to provide accurate predictions of various properties of the plant process and real-time operational transparency of the plant process. Additionally, a first-principles model is typically not suitable for an operation-centric application because such application requires a model to closely match plant measurements in real-time and be scalable for both hydraulic and thermodynamic calibrations. The numerous requirements for online and operation-centric modeling applications make using a first-principles model for these applications a challenge in the process industry.

SUMMARY OF THE INVENTION

Embodiments of the present invention address the challenges of using a first-principles model for online and operation-centric applications in the process industry. The embodiments are directed to automatically constructing, calibrating, and deploying online a first-principles model for use in operation-centric applications. The embodiments begin with a first-principles model (source model) encompassing a wide process scope (e.g., plant-wide scope) and developed for offline purposes, such as design or rating of the plant process. The embodiments dynamically transform this source model of wide process scope into a resulting calibrated operation-centric first-principles model (of operating unit scope). The calibrated operation-centric model is configured for a single operating unit (e.g., a distillation column, heat exchanger, reactor, and the like) of a plant and functional for online deployment to drive real-time decision making in operating the plant. In this way, plant operations (maintenance and control thereof) are automated with minimal to no human intervention at times.

The calibration performed by the embodiments to transform the source model includes flow and temperature reconciliations. These reconciliations enable the resulting operation-centric model to be driven by plant measurements collected from physical flow and temperature instruments of the operating unit at the plant. In this way, these reconciliations enable the operation-centric model to support real-time performance monitoring, predictive analytics, and automated controlling of the plant. The calibration performed by the embodiments on the operation-centric model further includes building a feed estimator used to estimate compositions of feed streams entering the modeled operating unit. An example of an operating unit of the plant included in the embodiments is a distillation column. The performance of the distillation column (and other similar operating units) is governed by the internal liquid and vapor flows within the distillation column. For the distillation column, the calibration performed by the embodiments on the operation-centric model further includes tuning the hydraulic model of the operation-centric model.

The embodiments deploy the calibrated operation-centric model online, where the operation-centric model calculates key process indicators (KPIs) for the modeled operating unit in real time. The deployed and calibrated unit process model calculates KPIs used to monitor, predict, and control the real-time operations of the modeled operating units. For the example of a distillation column operating unit, the operation-centric model calculates KPIs related to flows, temperatures, pressures, impurities of product streams, flooding percentage, vapor flowrate of critical states within the column, liquid flowrate of critical stages within the column, the overall mass balance of the column, and the temperatures at different column stages. Using the calculated KPIs, the embodiments provide accurate and real-time process information to plant control systems and personnel (e.g., plant operators, plant engineers, and the like) to enable real-time performance monitoring, predicting, and controlling of the plant operations.

Example embodiments are directed to computer systems, methods, and program products for generating an online unit process (operation-centric) model. The computer systems comprise at least one processor and memory with computer code instructions stored thereon. The memory is operatively coupled to the processor such that, when executed by the processor, the computer code instructions cause the computer system to implement a model converter, a model calibrator, and a deployment engine. In some embodiments, the computer code instructions further cause the computer system to implement the model calibrator to include a dataset creator, a flow reconciliation module, a temperature reconciliation module, a feed-estimator builder, and a hydraulic model. The computer program products comprises a non-transitory computer-readable storage medium having code instructions stored thereon. The storage medium is operatively coupled to a processor, such that, when executed by the processor, the computer code instructions cause the processor to generate the online unit process model.

The computer methods, systems (via the model converter), and program products identify a plant-wide process model of an industrial plant. The plant-wide process model is configured to perform offline operations of the industrial plant. In example embodiments, the plant-wide process model is a first-principles model. The computer methods, systems, and program products select a modeled operating unit contained in the plant-wide process model. The selected modeled operating unit corresponds to a physical operating unit at the industrial plant, such as a distillation column.

The computer methods, systems, and program products convert the plant-wide process model to a unit process (operation-centric) model of the modeled operating unit. In example embodiments, the converted plant-wide process model is a first-principles model. In some embodiments, the computer methods, systems, and program products convert the plant-wide process model by removing variables and equations unrelated to the selected modeled operating unit. In these embodiments, the computer methods, systems, and program products next update the plant-wide process model to replace the specification of the selected modeled operating unit with standard specification for the modeled operating unit, and converts its calculation basis to a standard form. In these embodiments, the computer methods, systems, and program products then reconfigure the process variables of the selected modeled operating unit. In some of the embodiments, the computer methods, systems, and program products reconfigure the process variables by identifying manipulated variables (MVs) and output variables (OVs) of the selected modeled operating unit and mapping each identified MV and OV to at least one instrument tag. In these embodiments, the computer methods, systems, and program products further define control loops of the selected modeled operating unit. The defined control loops identify the operating objectives of the selected modeled operating unit. In some embodiments, the computer methods, systems (via the model calibrator), and program products apply the unit process model to generate a rule engine that provides a user prescriptive guidance (e.g., via an alert score) on an event of the physical operating unit.

The computer methods, systems (via the model calibrator), and program products next recalibrate the unit process model to enable the unit process model to perform based on real-time measurements collected by instruments of the physical operating unit. In some embodiments, the computer methods, systems (via the dataset creator of the model calibrator), and program products create a dataset based on plant data retrieved from a real-time plant historian. The created dataset comprises a subset of the plant data collected at steady-state during a calibrated time horizon.

In some embodiments, the computer methods, systems (via the flow reconciliation module of the model calibrator), and program products reconcile modeled flow in the unit process model, which enables the unit process model to perform using measurements collected by physical flow instruments at the industrial plant. In some embodiments, the computer methods, systems (via the temperature reconciliation module of the model calibrator), and program products also reconcile modeled temperature in the unit process model, which enables the unit process model to perform using measurements collected by physical temperature instruments at the industrial plant. In these embodiments, the computer methods, systems (via the feed-estimator builder of the model calibrator) next build a feed estimator that enables the unit process model to estimate compositions of feed streams entering the selected operating unit. In some embodiments, if the selected modeled operating unit is a distillation column, the computer methods, systems (via the hydraulic model turner of the model calibrator) further tune a hydraulic model that represents internal liquid and vapor traffic flow of the distillation column in the unit process model.

In example embodiments, the computer methods, systems, and program products reconcile the modeled flow and modeled temperature by selecting expected errors in the respective physical instruments and dividing the plant data of the dataset into a training set and a test set. In these example embodiments, the computer methods, systems, and program products next generate optimization models for each data point in the training set and solve the optimization models to determine calibration parameters for the modeled flow or modeled temperature. In these example embodiments, the computer methods, systems, and program products then generate simulation models for each data point in the test set and solve the generated simulation models to determine quality of the determined calibration parameters. The calibration parameters of the modeled flow in these example embodiments may include flow offsets that represent the difference between measured flow by the physical flow instrument and flow calculated by the unit process model. Further, the calibration parameters of the modeled temperature in these example embodiments may include an efficiency parameter that represents degree of separation between measured temperature by the physical temperature instrument and temperature calculated by the unit process model, and an aeration parameter that represents whether measured pressure drop across the physical operating unit matches pressure drop calculated by the unit process unit.

The computer methods, systems (via the deployment engine), and program products then deploy the calibrated unit process model online in a plant process. To do so, the computer methods, systems, and program products calculate key process indicators (KPIs) based on real-time measurements collected by the instruments of the physical operating unit. The KPIs are used to monitor, predict, and control operational behavior of the physical operating unit at the industrial plant. In some example embodiments, the computer methods, systems, and program products deploy the unit process model by generating a dynamically executable version of the unit process model, which creates variables that link real-time measurements by the instruments of the physical operating unit to corresponding values calculated by the unit process model. The computer methods, systems, and program products next retrieve real-time measurements of the physical operating unit to set the linked variables associated with real-time measurements in the model. The computer methods, systems, and program products then solve the dynamically executable version of the unit process model, which sets linked variables associated to calculated model values and determines values for KPIs of the modeled operating unit. The computer methods, systems, and program products write the determined KPIs to a real-time historian for access by plant computers configured to predict and control the physical operating unit based on the KPIs. The computer methods, systems, and program products communicate with a control system computer to control the physical operating unit according to the predicted operational behavior of the physical operating unit.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Over the last three decades, significant efforts have been expended to deploy first-principles models online for uses such as real-time optimization and advanced process control (APC). Previous approaches to deploying first-principles models for such uses required manual, lengthy, and expensive model configuration and always involved expert intervention. These previous approaches often required weeks to months of time by a seasoned process engineer (expert) to build, calibrate, and deploy a first-principles model for use in a plant process. Thus, implementing a first-principles model online (particularly for operation-centric applications) with minimal effort is an important goal of plant operators and engineers.

Embodiments of the present invention are directed to computer methods, systems, and program products that provide several advantages in implementing first-principles models over previous approaches. For example, these embodiments encompass better technology that enables building, calibrating, and online deploying of the model, support improved workflows in the model, automate best practices in the model, and assist in management of the model over its entire lifecycle. Further, these embodiments do not require that an online first-principles model be constructed as a new model, but rather enables the creation of the model from an existing offline process model of a different scope. This leveraging of existing offline models is important in the process industry because many plants have invested tremendously in developing large collections of existing process models for different offline purposes.

System for Building, Calibrating, and Deploying Unit Process Model

Figure 1:
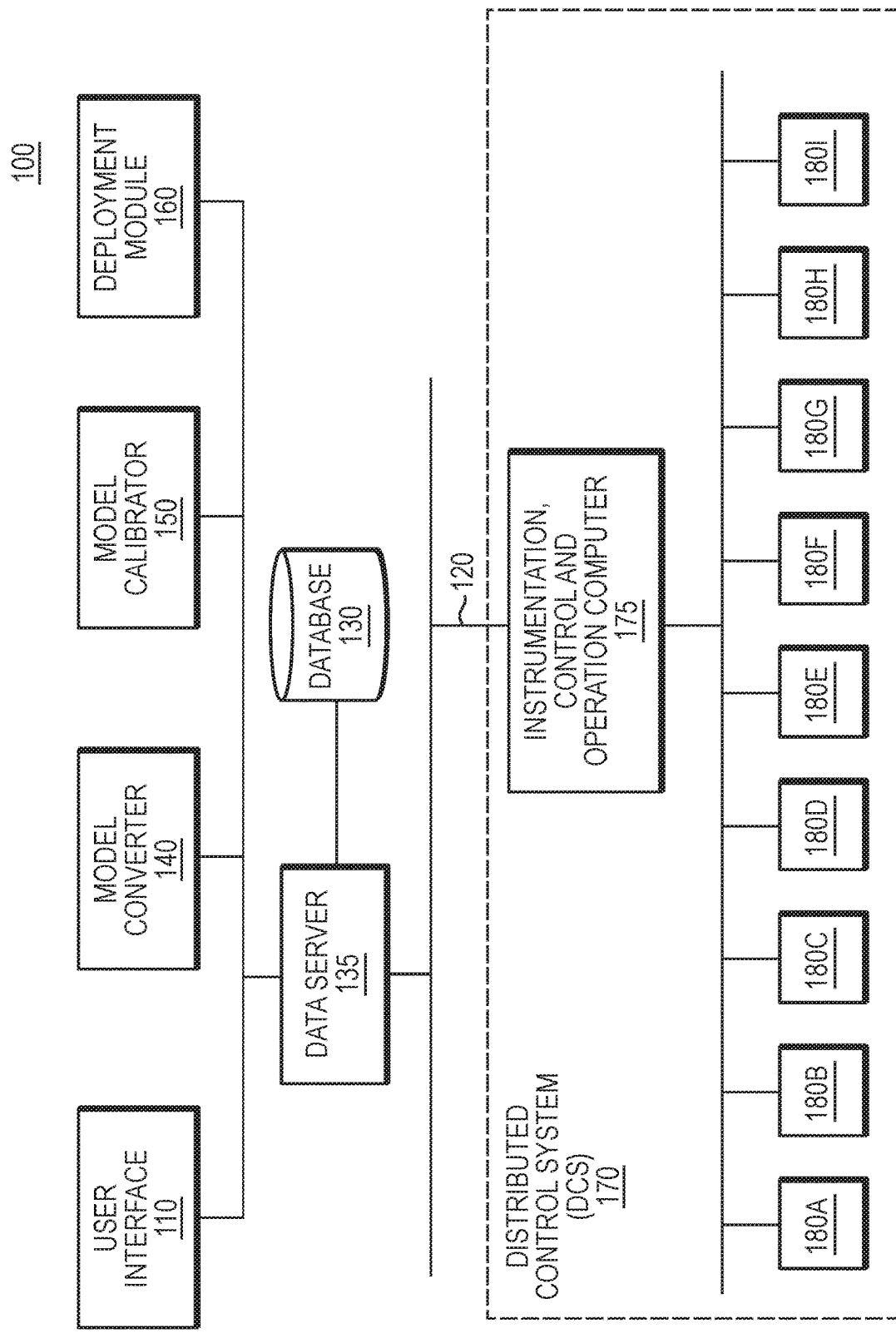
FIG. 1 is a block diagram depicting a computer system configured to build, calibrate, and deploy a unit process model in embodiments of the present invention.

FIG. 1 is a block diagram depicting a computer system 100 configured to build, calibrate, and deploy online a unit process (operation-centric) model in embodiments of the present invention. The computer system 100 is configured within the network infrastructure of an industrial, chemical, or other such plant. The computer system 100 includes one or more computers (e.g., application servers) configured to execute a model converter 140, a model calibrator 150, and a deployment engine 160. The computer system 100 also includes a user interface (e.g., graphical user interface) 110 configured on a display device, and a centralized data store (databases) 130 coupled to a data server 135. The computer system further includes a distributed control system 170 configured with an instrumentation, control, and operation computer 175 communicatively coupled to instrument devices 180A-180l, such as sensors, meters, probes, valves, actuators, gages, heaters, and the like, that physically measure and control an operating unit at the plant. The user interface 110, centralized data store 130 (via data server 135), model converter 140, model calibrator 150, deployment engine 160, and distributed control system 175 are communicatively coupled within the computer system 100 via a plant network 120.

The computer system 100 is configured to dynamically build, calibrate, and deploy online a unit process model that drives real-time decision making regarding a physical operating unit at an industrial, chemical, or other such plant. The model converter 140 of the computer system 100 builds the online unit process model from a plant-wide process model (source model). The source model may be a first-principles process model of the plant-wide operations. To build the unit process model, the model converter 140 displays to the user on the user interface 110 (via the plant network 120) an option to select a source model. For example, the model converter 140 may provide a field on the user interface 110 for the user to specify a source model. For another example, the model converter 140 may retrieve a list of source models by querying the centralized data store 130 or another reachable location within the plant network 120. The model converter 140 may then display the list of source models on the user interface 110 in a format that enables the user to select one of the source models. The selected source model may be configured in the form of a flowsheet, or other structured format, which includes unit operations of the modeled process and the material, energy, and information flow among the unit operations.

After the user selects a source model, the model converter 140 displays to the user on the user interface 110 the modeled operating units (unit operations) contained in the source model, such as a distillation column, heat exchanger, reactor, and the like. Each modeled operating unit corresponds to a physical operating unit at the plant. To do so, the model converter 140 may read the selected source model from the centralized data store 130 or another reachable location within the plant network 120. The model converter 140 may then display the modeled operating units of the read source model on the user interface 110 in a format that enables the user to select an operating unit of interest. The model converter 140 may also display the operating units within the read source model on the user interface 110 in a graphical representation, list representation, spreadsheet representation, or other such representation depicting the dependencies between the unit operations.

After the user selects a unit operation, the model converter 140 converts the source model into a unit process (operation-centric) model of the selected modeled operating unit. The model converter 140 displays the converted unit process model on the user interface 110 in a format that enables the user to map key process variables (e.g., manipulated variables, output variables, and the like) to instrument tags for the selected modeled operating unit. The model converter 140 further displays the converted unit process model on the user interface 110 in a format that enables the user to configure control loops in the unit process model to indicate the operating objectives of the selected modeled operating unit. The model converter 140 then stores the converted unit process model structured in computer memory, such as in a configuration file. For example, the model converter 140 may store the converted unit process model as a configuration file in the centralized data store 130 or another reachable location within the plant network 120.

Once the unit process model is built, the model calibrator 150 calibrates the unit process model. To perform the calibration, a dataset creator component of the model calibrator 150 first creates a calibration dataset for use in reconciling the unit process model. The dataset creator provides the user an option at the user interface 110 to calibrate a time horizon for the dataset. The data creator then retrieves plant data from a real-time plant historian (located at the centralized data store 130 or another location on the plant network 120) in the calibrated time horizon. The data creator (of the model calibrator 150) retrieves plant data that corresponds to the mapped instrument tags and selects a subset of the retrieved plant data representing steady-state behavior of the plant process as the calibration dataset.

A flow reconciliation module of the model calibrator 150 then uses the created dataset to reconcile the modeled flow. The flow reconciliation module calculates flow offsets (calibration parameters) for modeling the product streams entering the modeled operating unit. The calculated flow offsets define the difference between a flow measurement by a flow instrument (e.g., one or more of 180A-180E) of the physical operating unit at the plant and a corresponding flow value calculated by the unit process model. The temperature reconciliation module of the model calibrator 150 similarly uses the created dataset to reconcile the modeled temperature. In the example of the modeled operating unit being a distillation column, the temperature reconciliation module calculates calibration parameters comprising efficiency and aeration parameters of the modeled operating unit. The efficiency parameter represents the degree of separation between a temperature measured by instruments (e.g., one or more of 180A-180E) of the physical distillation column at the plant and a corresponding temperature value calculated by the unit process model. The aeration parameter represents whether the measured pressure drop across the distillation column at the plant matches the pressure drop calculated by the unit process model. By reconciling the modeled flow and temperature, the unit process model can perform at steady-state using measurements collected by physical flow and temperature instruments (e.g., one or more of 180A-180E) of the physical operating unit at the plant.

A feed-estimator builder of the model calibrator 150 next builds a feed estimator to estimate the compositions of the feed streams entering the physical operating unit (modeled by the unit process model). The feed-estimator builder updates the created calibration dataset for the unit process model with the estimated feed compositions and again reconciles (flow and temperature) of the unit process model using the updated dataset. If the operating unit is a distillation column (or similar unit), a hydraulic model tuner of the model calibrator 150 then represents liquid and vapor traffic at each stage of the distillation column. The hydraulic model tuner calculates values for the adjustable parameters (e.g., system foam factor and such) that enables the hydraulic model to accurately predict the zone (e.g., stable operation zone, unstable operation zone, and a problem operation zone) in which a given stage within the distillation column is operating. The model calibrator 150 may update the stored configuration file of the converted unit process model in the centralized data store 130 or another reachable location within the plant network 120 with the calibration parameters.

Once the unit process model is calibrated, the deployment engine 160 deploys the unit process model online. To do so, the deployment engine 160 reads the configuration file storing the calibrated unit process model, and associates the configuration file with real-time plant data to dynamically execute the model online. The deployment engine 160 retrieves the real-time plant data from the real-time plant historian located in the centralized data store 130 (via the data server 135) or another location on the plant network 120. The real-time plant data is collected in real-time by the instrumentation, control, and operation computer 175 from physical instruments (e.g., a subset of 108A-108I) of the plant network 120 and written to the real-time plant historian for retrieval by other plant computers, such as the computer configured with the deployment engine 160. The deployment engine 160 associates the online unit process model to link with the retrieved real-time plant data and solves the online unit process model to compute values for KPIs of interest, which are written to the real-time plant historian 130. From the real-time plant historian 130, plant computers, such as the instrumentation, control, and operation computer 175 may access the KPI values to perform real-time monitoring and predictive analytics of the operations of the modeled operating unit. Based on the monitoring and predictive analytics, the instrumentation, control, and operation computer 175 may program plant instruments (e.g., a subset of 108A-108I) to settings that optimize, or otherwise control, operations of the modeled operating unit or other operating units of the plant. The instrumentation, control, and operation computer 175 may also provide data on the monitoring and predictive analytics to plant operators, or other plant personnel, via the user interface 110 to take actions to optimize or otherwise control operations of the model operating unit or other operating units of the plant.

Example User Interface Screens

Figure 2:
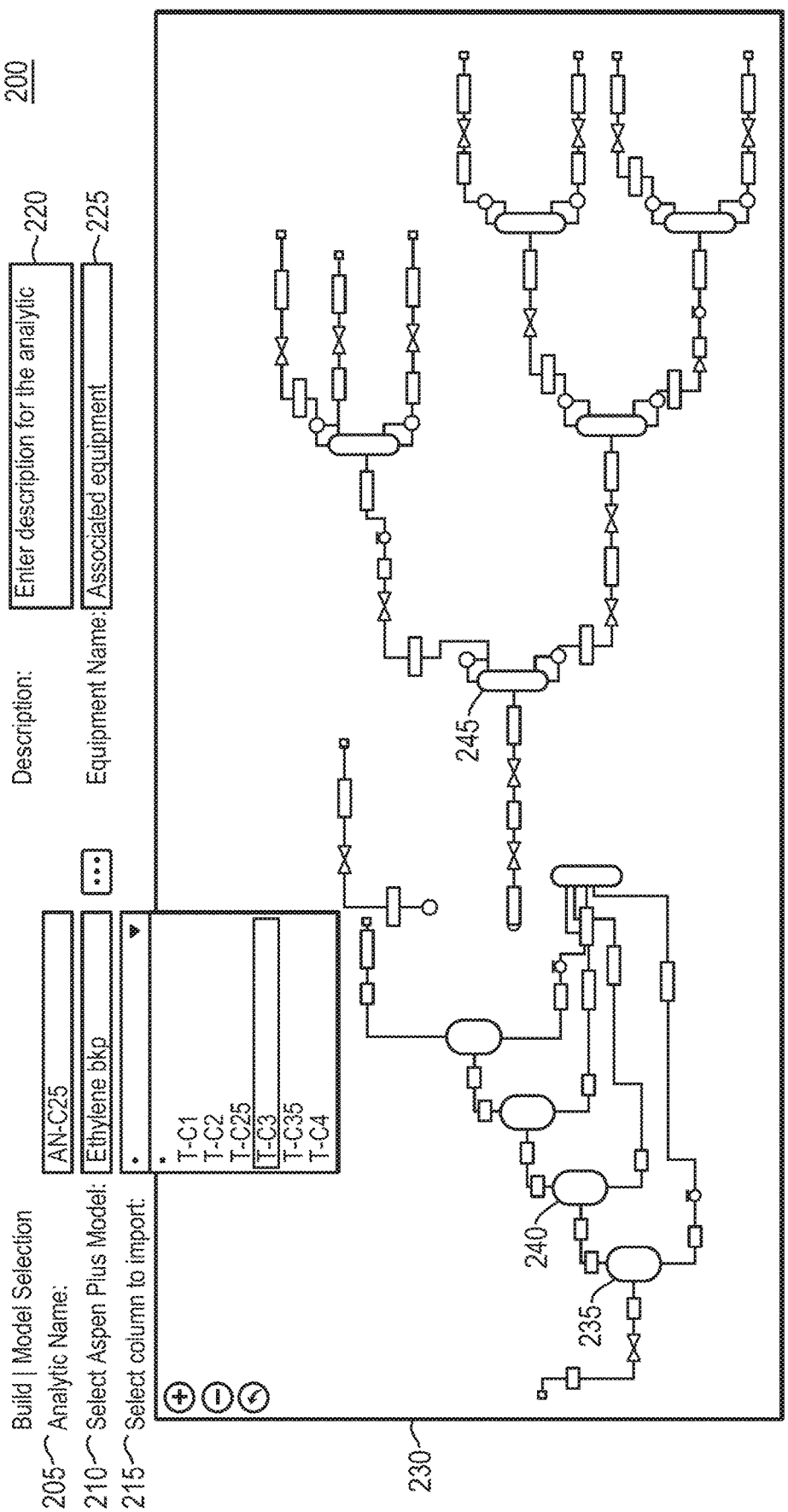
FIGS. 2-4 are schematic views of parts of a user interface employed to build the unit process model in embodiments of the present invention.
Figure 3:
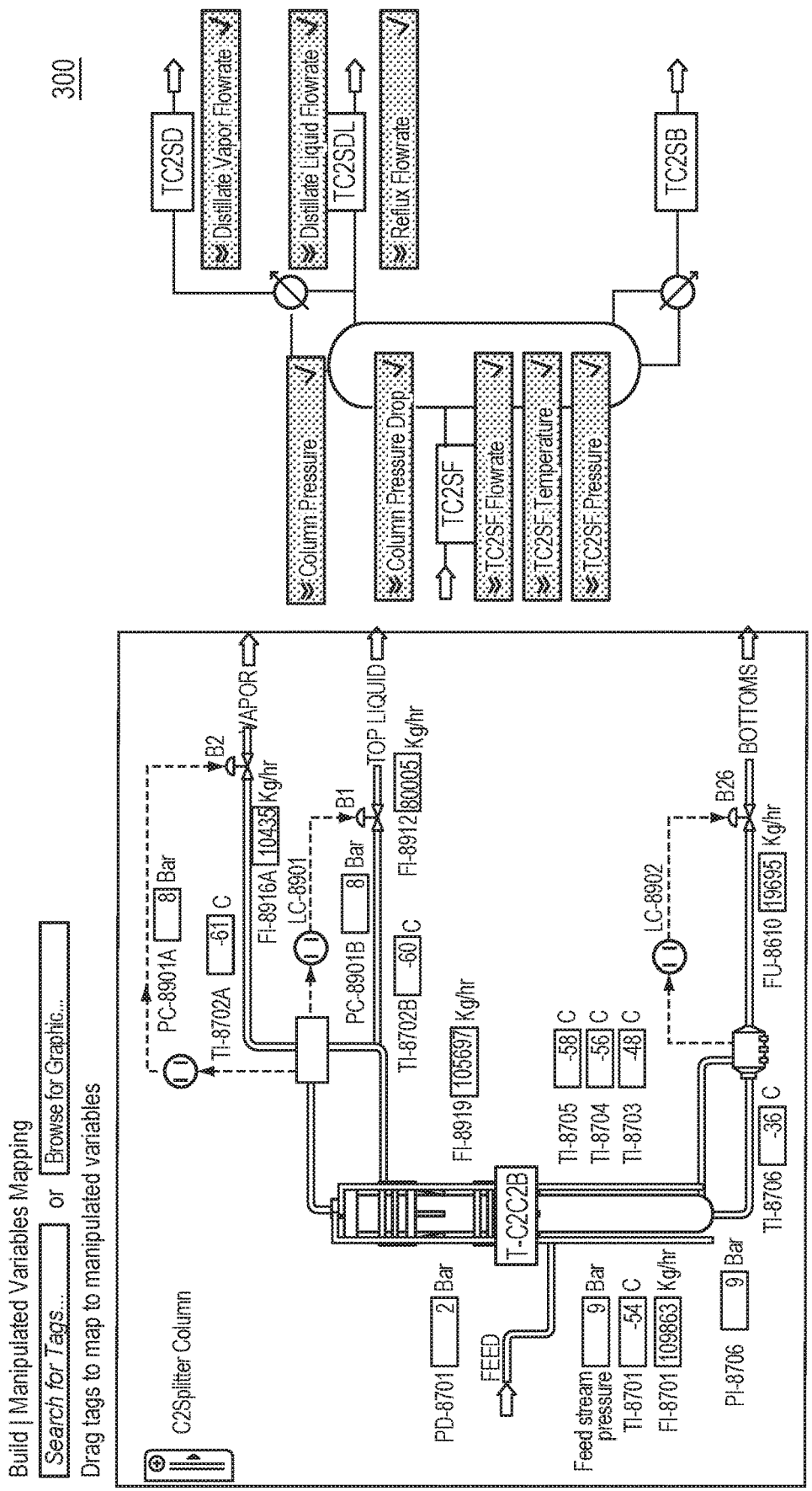
Figure 4:
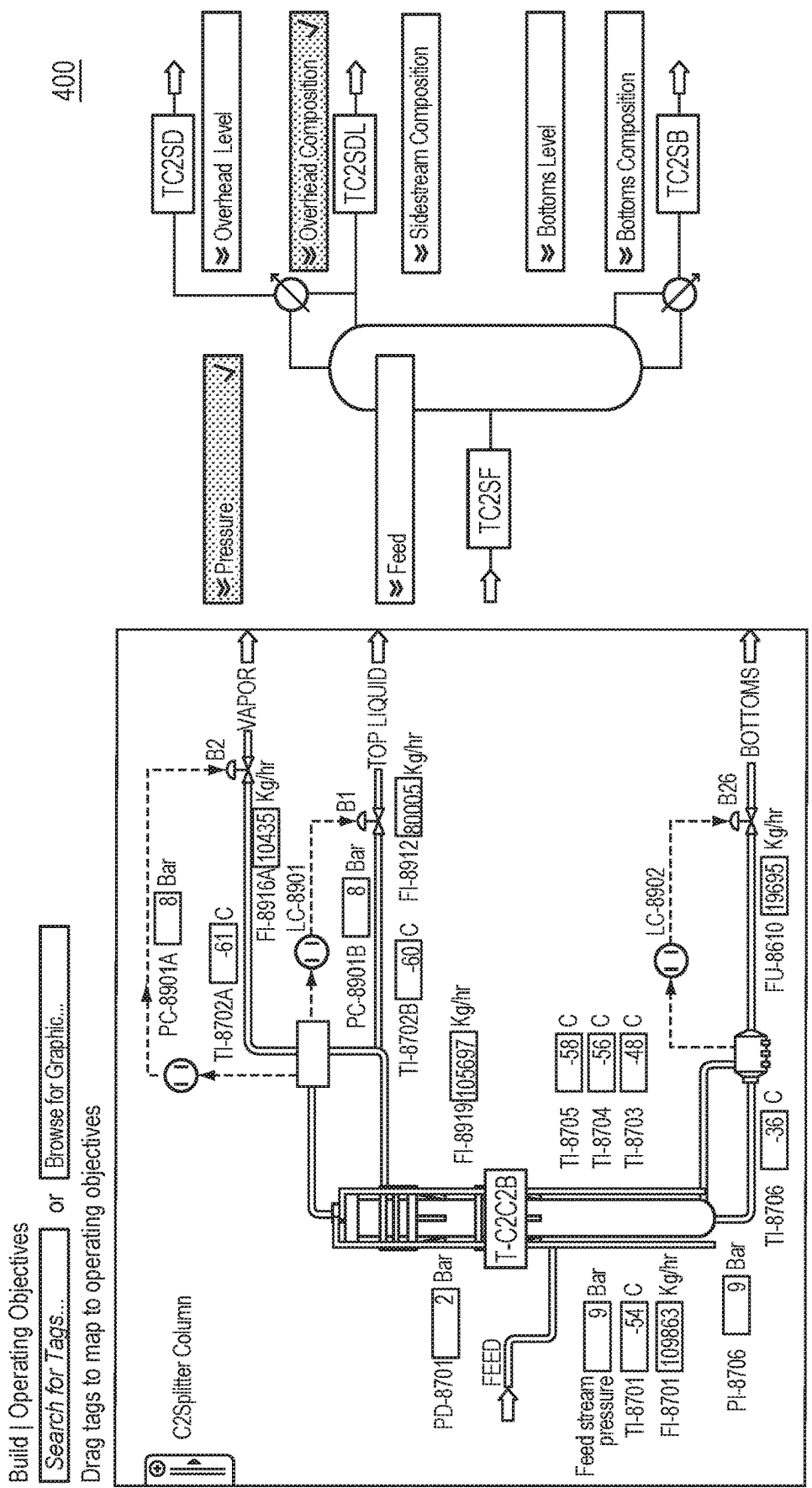

FIGS. 2-4 are schematic views depicting example user interface screens 200-400 employed in embodiments of the present invention. The model converter 140 may display the example user interface screens 200-400 to the user as part of the process of building a unit process model. FIG. 2 illustrates an example user interface screen 200 for generating a unit process first-principles model from a source model (plant-wide first-principles process model). The example user interface screen 200 enables a user to provide a name 205 for the unit process model and provide a description 220 related to the unit process model. The example user interface screen 200 further enables the user to select a source model 210 for conversion to the unit process model. The example user interface screen 200 graphically displays the selected source model 230, including displaying operating units 235, 240, 245, etc of the source model and the material, energy, and information flows among the operating units 235, 240, 245, etc.

The user may select one of the displayed operating units 235, 240, 245, etc of the displayed source model 230 for conversion to the unit process model. To do so, the user chooses a label (e.g., T-C1, T-C2, T-C3, and such) associated with the operating unit from the drop down list 215. For example, in FIG. 2, the user selects the label T-C3 associated with a distillation column operating unit from the drop down list 215. The user interface screen 200 displays to the user the equipment name 225 corresponding to the selected operating unit associated with the chosen label. The example user interface screen 200 provides an option (not shown), such as a button or any other graphical selector, for the user to initiate the conversion of the source model to a unit process model for the selected modeled operating unit.

FIG. 3 illustrates an example user interface screen 300 for mapping instrument tags to key process variables (manipulated variables and output variables) of the operating unit in the generated unit process model. As shown in FIG. 3, the example user interface screen 300 presents the user the key manipulated variables (Column Pressure, Feed Flowrates [i.e., "TC2SF Flowrate" in FIG. 3], Product Flowrates [i.e., "Distillate Vapor Flowrate" and "Distillate Liquid Flowrate" in FIG. 3], and such) of the distillation column operating unit displayed in the unit process model. The example user interface screen 300 further provides the user instrument tags (PU-8706, FU-8610, and such) that the user may drag to map to the manipulated variables.

FIG. 4 illustrates an example user interface screen 400 for mapping control loops to the operating unit in the generated unit process model. As shown in FIG. 4, the example user interface screen 400 presents the user the control loops (Product Composition, Tray Temperature [i.e., "Overhead Composition" and "Bottoms Composition" in FIG. 4], and such) of the distillation column operating unit displayed in the unit process model. The control loops are defined by a pair of process variables (a manipulated variable and a controlled variable) of the operating unit. The example user interface screen 300 further provides the user instrument tags (PU-8706, FU-8610, and such) that the user may drag to map the control loops to operating objectives of the modeled operation unit.

Method of Building Unit Process Model

Figure 5:
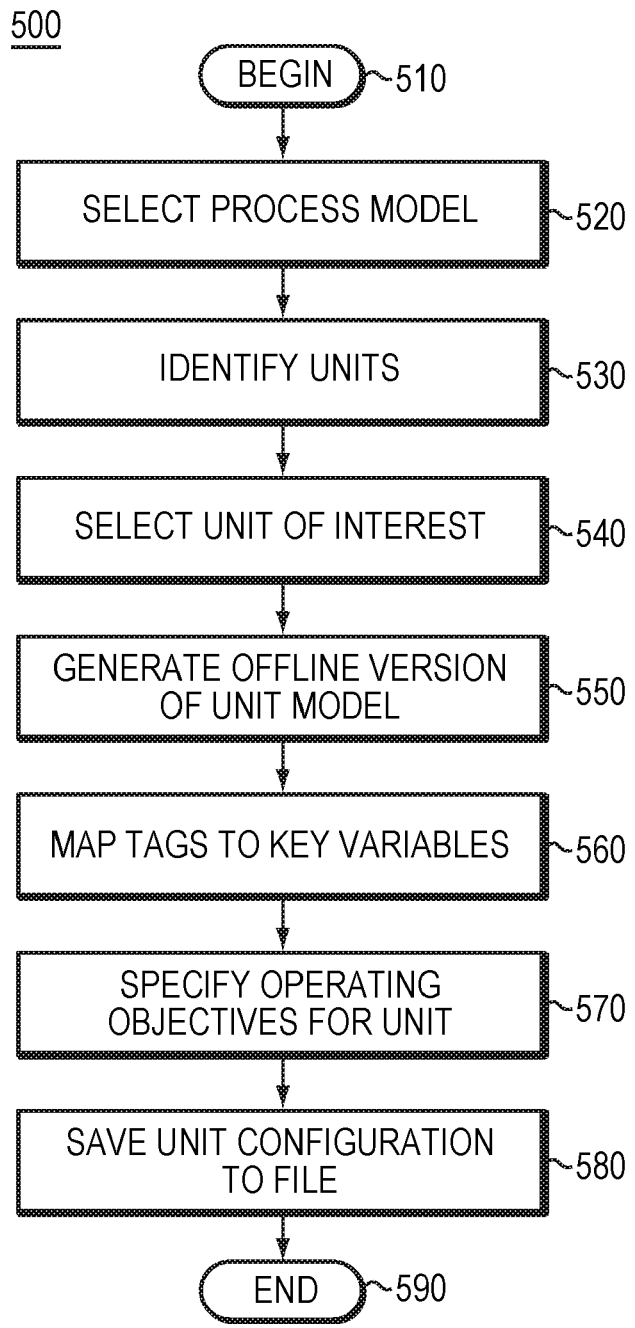
FIG. 5 is a flow diagram depicting a method of building a unit process model in embodiments of the present invention and employed by the model converter of FIG. 1.

FIG. 5 is a flow diagram depicting a computer-implemented method 500 of building a unit process model in embodiments of the present invention. In some embodiments, the model converter 140 of FIG. 1 executes the method 500 to build the unit process model. The method 500 begins at step 510.

At step 520, the method 500 selects a process model (source model) for an industrial, chemical, or other such plant. In some embodiments, the method 500 (step 520) enables a human or system user to select the source model via the user interface 110. In other embodiments, the method 500 (step 520) may automatically select the source model based on programmed criteria, parameters accessed from the centralized data store 130, or communication with operating devices (e.g., 175 and 108A-108I of FIG. 1) in the plant network 120. The selected source model is a first-principles model (encompassing wide plant process scope) developed and configured for offline use, such as for design or rating of the plant operations. The selected model contains operating units (e.g., distillation columns, and the like) of the modeled plant process and the material, energy, and information flows among the operating units. In some embodiments, the process model may include only the key (major) operating units of the plant process.

The method 500, at step 530, identifies the modeled operating units contained within the source model. Each modeled operating unit corresponds to a physical operating unit at the plant. For example, the method 500 (step 530) may access the selected source model from a centralized data store 130 or other reachable location in the plant network 120 to identify its operating units. The method 500 (step 530) may then read, parse, search, or otherwise process the accessed source model to identify the modeled operating units, and corresponding information, of the selected source model. In some embodiments, the method 500 (step 530) may display the operating units to the user on the user interface 110, along with an option for selecting one or more of the modeled operating units. For example, the model converter 140 may present the modeled operating units to the user within a graphical representation of the source model (such as shown in FIG. 2), in a list representation, in a flowsheet representation, or any other structured representation without limitation.

The method 500, at step 540, selects a modeled operating unit of interest from the identified modeled operating units. In some embodiments, a human or system user may select the modeled operating unit using the selection option (e.g., 215 of FIG. 2) on the user interface 110. In other embodiments, the method 500 (step 540) may automatically select the source model based on programmed criteria, parameters stored in the centralized data store 130, or communication with operating devices (e.g., 175 and 108A-108I of FIG. 1) in the plant network 120. Once the method 500 (step 540) selects the operating unit of interest, the method 500, at step 550, generates an offline version of a unit process model for the selected modeled operating unit.

The method 500, at step 550, generates an offline unit process model by converting the source model (of wide plant scope) into a model centric to only the selected modeled operating unit. To perform this conversion, the method 500 (step 550) first automatically reduces the scope of the source model to the scope (level) of the selected modeled operating unit by discarding information from the model not directly relevant to the selected modeled operating unit. For example, if there are multiple operating units in the process, the method 500 (step 550) excludes all information (process variables, equations, and the like) pertaining to the other modeled unit operations (i.e., not pertaining to the selected modeled operating unit). Next, the method 500 (step 550) automatically replaces the existing specifications for the selected modeled operating unit with a set of standard specifications for the modeled operating unit. The replaced specifications may include design, operating, pressure, efficiency, and any other such standard specifications for the selected modeled operating unit. The method 500 (step 550) also converts the calculation basis in the source model to a standard calculation form. For example, if the source model is configured in a molar or volumetric basis, the method 500 (step 550) automatically converts the model to a mass basis. The standard specifications and standard calculation form for the selected modeled operating unit may be retrieved from the centralized data store 130 or other location on the plant network 120. Further, if the selected operating unit is a distillation column, the method 500 (step 550) creates internal column sections (calibration variables) in the unit process model to support accurate calibration of the model.

The method 500, at step 560, maps instrument (production) tags to key process variables of the unit process model. In other embodiments, other methods may be used to map instruments (components) of the modeled operating unit to key process variables in the unit process model. To do so, the method 500 (step 560) retrieves key process variables for the operating unit from the generated unit process model. These process variables comprise two types of process variables: manipulated variables (MVs) and output variables (OVs). The MVs are input variables that need to be set to solve the unit process model. The OVs are output variables of the unit process model that are calculated based on measurements taken by instruments of the physical operating unit. The OVs may include output stream flow variables used to calculate a mass balance around the modeled operating unit, output tray temperature variables that are useful in determining whether the model is an accurate representation of the actual (physical) plant operation, and the like. The method 500 (step 560) also retrieves instrument tags for the modeled operating unit from a plant data historian (e.g., in the centralized data store 130) and maps these instrument tags to the retrieved key process variables. In some embodiments, the method 500 (step 560) presents the retrieved instrument tags and process variables to the user on user interface 110, and enables the user to position (e.g., drag) the instrument tags to the process variables (such as shown in FIG. 3).

The method 500 (step 560) performs these mappings of instrument tags because the source model being used to seed the configuration of the unit process model is often developed on a theoretical basis. As such, the method 500 (step 560) performs the instrument tag mappings to align the unit process model to the actual physical configuration of the operating unit at the plant. If the source model was developed on an actual basis, the method 500 may omit step 560 as the unit process model is already aligned to the actual (physical) operating unit configuration.

The method 500, at step 570, specifies operating objectives for the modeled operating unit of the unit process model. To do so, the method 500 (step 570) maps instrument (production) tags to control loops that indicate the operating objections of the modeled operating unit. In other embodiments, other methods may be used to map instruments (components) of the modeled operating unit to control loops in the unit process model. Each control loop is defined by a pair of variables: a MV and a controlled variable (CV). The method 500 (step 560) generates a standard set of control loops for the modeled operating unit. The method 500 further retrieves instrument tags for the modeled operating unit from a plant data historian (e.g., in the centralized data store 130) and maps these instrument tags to the generated control loops. The mapping of these instrument tags identifies which control loops are present on the actual operating unit in the plant to indicate the operating objectives of the modeled operating unit. In some embodiments, the method 500 (step 560) presents the retrieved instrument tags and control loops to the user on user interface 110, and enables the user to position (e.g., drag) the instrument tags to the control loops (such as shown in FIG. 4).

The method 500, at step 580, saves the generated unit process model (including mapped process variables and control loops) to a configuration file in memory on the plant network 120 (e.g., in the centralized data store 130). This saved version of the unit process model is referred to as the offline version. The method 500 of building the unit process model ends at step 590.

Method of Calibrating Unit Process Model

Figure 6A:
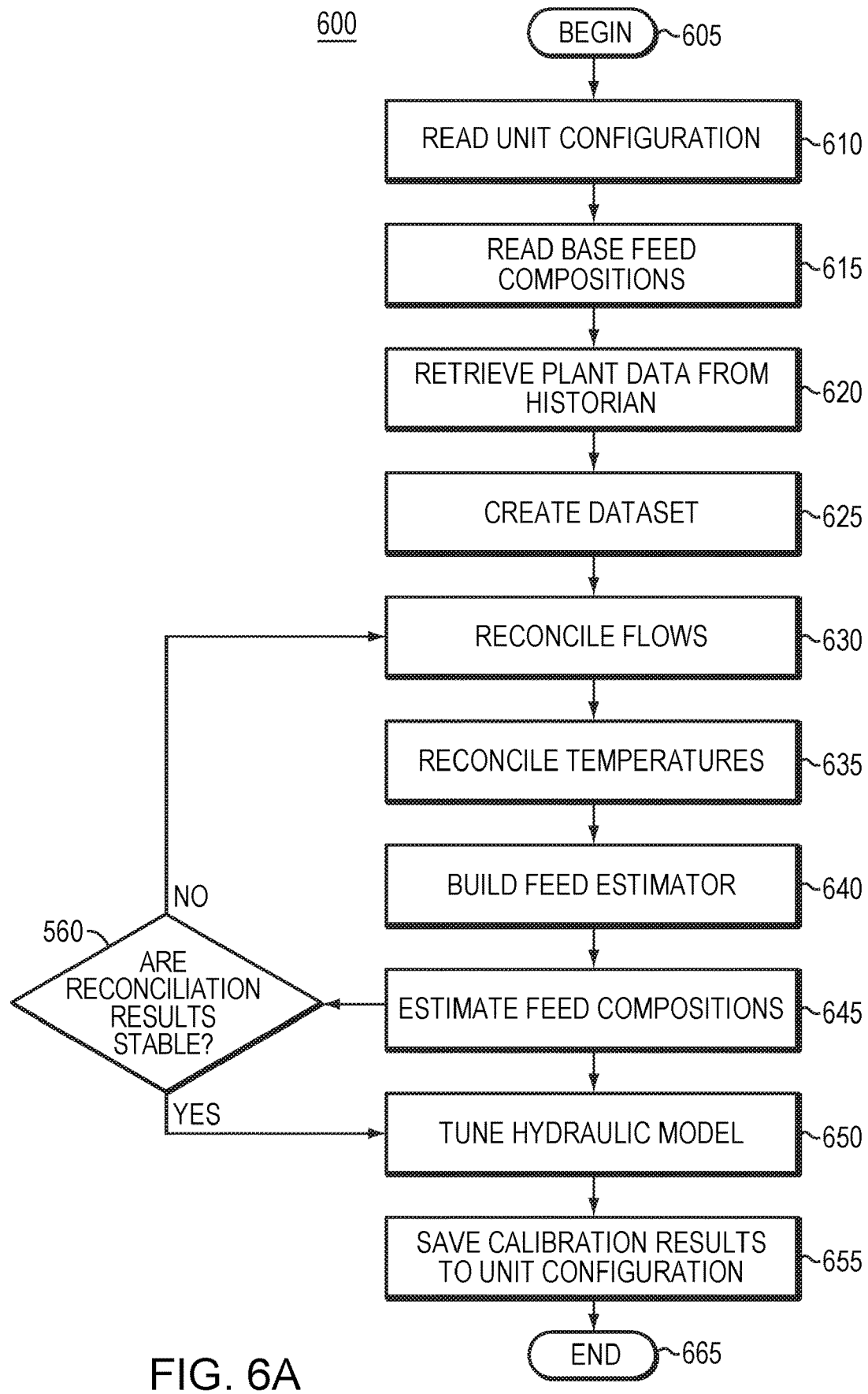
FIG. 6A is a flow diagram depicting a method of calibrating a unit process model in embodiments of the present invention and employed by the model calibrator of FIG. 1.

FIG. 6A is a flow diagram depicting a computer-implemented method 600 of calibrating a unit process model in embodiments of the present invention. The method 600 may be used to calibrate the unit process model generated by method 500 of FIG. 5. In some embodiments, the model calibrator 150 of FIG. 1 executes the method 600 to build the unit process model. In the embodiment of FIG. 6A, the unit process model is a first-principles model. The method 600 calibrates the unit process model to function online to drive real-time decision making at the plant in relation to the modeled operating unit. As part of the calibration, the method 600 reconciles components of the unit process model to enable the model to perform online using measurements collected in real-time from physical instrumentation (e.g., 108A-108I of FIG. 1) at the plant. In this way, the reconciled unit process model can accurately monitor and predict the plant operations related to the operating unit at the plant. The online model, in turn, can output accurate and real-time predictive analytics on the modeled operating unit to plant control systems (e.g., computer 175 of FIG. 1) and plant personnel (e.g., plant engineers, operators, and the like).

Create Model Dataset

The method 600 begins at step 605. At step 610, the method 600 reads the configuration file for a unit process model. In some embodiments, the unit process model was generated by method 500 and the configuration file saved at step 580 of method 500. The method 600, at step 615, reads (initializes) base feed compositions of the feed streams entering the operating unit modeled by the unit process model. The method 600 (step 615) may read the base feed compositions of the modeled operating unit from the source model that was used to build the unit process model (as described in reference to FIG. 5). The method 600 (step 615) may compute a feed composition range for each key component of the modeled operating unit as a percentage above and below the base feed composition.

The method 600, at step 620, retrieves plant data for calibrating the unit process model from the real-time plant historian, which may be located in the centralized data store 130 or another location in the plant network 120. The method 600 (step 620) queries and retrieves plant data from the plant historian corresponding to the instrument tags mapped to the unit process model (at steps 560-570). The method 600 (step 620) retrieves the plant data from the plant historian for a calibrated time horizon (e.g., time horizon selected by a user at user interface 110). The method 600 (step 620) further determines the maximum and minimum values (value range) for each MVs of the operating unit from the retrieved plant data.

The method 600, at step 625, creates a dataset for use in reconciling the unit process model. In some embodiments, a dataset creator component of the model calibrator 150 may execute steps 610-625 of method 600. To create a functional dataset, the method 600 (step 625) first conditions the plant data of the calibrated time horizon retrieved from the plant historian (step 620). In some embodiments, the method 600 (step 625) performs interpolation to condition the plant data, which provides control over the exact time horizon (timestamp) of plant data queries/retrieved from the plant historian. The method 600 (step 625) then performs a rolling average over the interpolated plant data to create the dataset. The created dataset may be used in subsequent steps of method 600, both for determination of steady-state regions and model generation.

For each data point of the conditioned plant data, the method 600 (step 625) computes a mass balance around the operating unit and corresponding mass balance error (MBE) in the unit process model. The method 600 (step 625) computes the mass balance as the sum of all outlet mass flow rates minus (−) the sum of the inlet mass flow rate, and computes the MBE as the mass balance normalized by the sum of the inlet flow rates. The method 600 (step 625) then identifies time regions of steady-state behavior within the calibrated time horizon (calibration window). As shown in the FIG. 6B, the method 600 (step 625) examines the statistics of the mass balance error over the calibration window. The method 600 classifies each data point in the calibration window as potentially existing in a steady-state cluster, if the mass balance error of the data point is within a steady-state band defined by the mass balance average and deviation. For a time region of the time horizon window to be considered as a steady state cluster, it must contain n consecutive data points (where n is a configurable parameter) that have a MBE that falls within Average MBE−standard deviation of MBE<MBE<Average MBE+standard deviation of MBE. The method 600 (step 625) then selects a subset (system configurable parameter) of the data points within the identified steady-state regions to create the dataset. The data points are chosen so that the number of steady-state regions sampled is maximized, with the longest consecutive steady-state time regions being given the highest sampling priority.

Flow Reconciliation

The method 600, at step 630, uses the created dataset to reconcile the modeled flow in the unit process model. The reconciliation enables the unit process model to perform (be driven) using measurements collected in real-time by physical flow instruments of the modeled operating unit (or other operating unit) at the plant. In some embodiments, a flow reconciliation module of the model calibrator 150 may execute step 630. Flow reconciliation of the unit process (first-principles) model involves calculating calibration parameters for the model, such that the model can be used as an accurate proxy of the modeled operating unit when the plant system is at steady state. The calibration parameters for flow reconciliation are the flow offsets for the product streams entering the operating unit. A flow offset is the difference between the measured flow value by a physical flow instrument of the operating unit at the plant and the flow value calculated by the unit process model (i.e. flow offset value=observed plant value−model predicted value). In order for the method 600 (step 630) to perform flow reconciliation, the feed compositions of these product streams must be known. However, a feed estimator is required to calculate the feed compositions, but a feed estimator can only be built if a reconciled unit process model (first-principles) model is already available. To handle the dependency between flow reconciliation and the building of a feed estimator, the method 600 initialized the feed compositions from the source model (at step 615) prior to performing flow reconciliation.

To calculate calibration parameters (flow offsets) for flow reconciliation, the method 600 (step 630) divides (groups) the data points of the dataset created in step 625 into a training set and a test set to maximize the range of test and training points over the calibration window. The method 600 (step 630) may maximize the range by use of a steady-state detector that maximizes variations in the steady state clusters determined in step 625. The steady-state detector should ideally: (1) maximize the number of unique steady-states utilized for calibration of the model and (2) provide steady-state clusters which span the entire calibration window. The method 600 (step 630) provides logical improvements to a steady-state detector in embodiments of the present invention. To do so, the method 600 (step 630) prioritizes steady-state cluster selection based upon distance between steady-state points. In embodiments, the fraction of points which are used as training points is a system configuration parameter.

The method 600 (step 630) then determines expected errors in the flow instruments of the modeled (physical) operating unit. In some embodiments, a user may configure the expected errors in the flow instrument via user interface 110. The method 600 (step 630) next generates first principles models for all the points in the training set in view of the determined expected errors and solves an optimization computation on the first principle model, where the errors between the plant measurements and model variables are minimized. The calibrated parameters of a generated first principles model includes flow offsets between the plant and model variables, as well as, other first principles model parameters (e.g. efficiency in the case of a distillation column model). The method 600 (step 630) repeats the generating/solving of the optimization models for multiple training runs. The method 600 (step 630) calculates the average value of each flow offsets over all of the training runs, and sets the calibration parameters to the calculated average values of the flow offsets.

The method 600 (step 630) next generates simulation models for all the points in the test set in view of the determined expected errors. The generated simulation models incorporate the calibrated parameters found in steps 630 and 635 of method 600. The method 600 further solves the generated simulation models (with the calibration parameters fixed) to determine the quality of the calibration parameters (average flow offsets). The generating/solving of the optimization models is repeated for multiple test runs. That is, the test runs, which are executed after the completion of the training runs, use the determined calibration parameters and estimated quality to generate data (model predictions) which are in turn presented to the user (e.g., human or system), along with the actual plant values, so that the user may judge the quality of the calibrated model.

Temperature Reconciliation

The method 600, at step 635, uses the created dataset (step 625) to reconcile the modeled temperature in the unit process model. The reconciliation enables the unit process model to perform (be driven) using measurements collected in real-time by physical temperature instruments at the modeled operating unit (or other operating unit) at the plant. In some embodiments, a temperature reconciliation module of the model calibrator 150 may execute step 635. Temperature reconciliation of the unit process (first-principles) model, similar to flow reconciliation (step 630) of the model, involves calculating calibration parameters for the model, such that the model can be used as an accurate proxy of the modeled operating unit when the plant system is at steady state. When the modeled operating unit is a distillation column, the calibration parameters are the efficiency and aeration parameters (variables) for the modeled operating unit. The model 600 (step 635) sets the efficiency parameter as a degree of freedom which is moved by the computational engine during a solve set to minimize errors between the plant measurements and model predictions.

The method 600 (step 635) calculates a value for the aeration parameter that enables the calculated column pressure drop to match the measured pressure drop across the physical distillation column at the plant. The method 600 (step 635) performs the calculation within the first principle model by first introducing a new model variable representing the difference between the model predicted bottom stage pressure and the model predicted top stage pressure (i.e., the model predicted column pressure drop variable). The method 600 (step 635), next, simultaneously changes the specification of the aeration parameter from fixed to calculated, and the specification of the model predicted column pressure drop variable from calculated to fixed. The method 600 (step 635), then, equates the model predicted column pressure drop variable to the observed pressure drop in the plant.

Figure 6B:
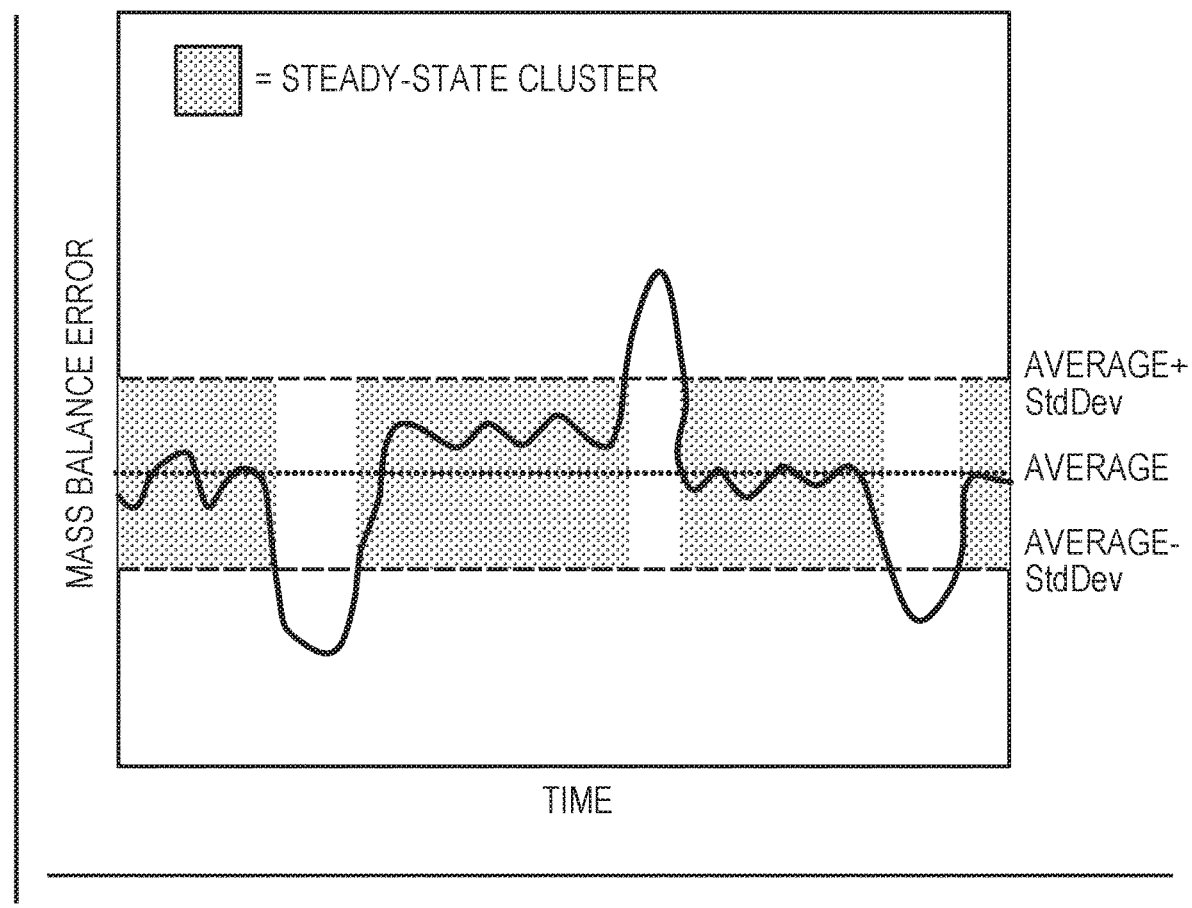
FIG. 6B is a graphical representation of an example steady-state algorithm utilized in the method of FIG. 6A in embodiments of the present invention.

To calculate calibration parameters for temperature reconciliation, the method 600 (step 635) divides (groups) the data points of the dataset created in step 625 into a training set and a test set. The method 600 (step 635) may maximize the range by use of a steady-state detector that maximizes variations in steady state clusters determined in step 625 (as shown in FIG. 6B). To do so, the method 600 (step 635) prioritizes steady-state cluster selection based upon distance between steady-state points. The method 600 (step 630) then determines expected errors in the temperature instruments of the modeled (physical) operating unit. In some embodiments, a user may configure the expected errors in the temperature instrument via user interface 110. The method 600 (step 635) next generates first principle models for all the points in the training set in view of the determined expected errors. Then method 600 (step 635) solves an optimization computation on the first principle model, where the errors between the plant measurements and model variables are minimized to determine the calibration parameters, including the efficiency and aeration parameters (in the case where the operating unit is a distillation column). The method 600 (step 635) repeats the generating/solving of the optimization models for multiple training runs. The method 600 (step 635) calculates the average value over all of the training runs, and sets the calibration parameters to the calculated average values.

The method 600 (step 635) next generates simulation models for all the points in the test set in view of the determined expected errors. The method 600 further solves the generated simulation models to determine the quality of the calibration parameters. The generating/solving of the optimization models is repeated for multiple test runs. That is, the test runs, which are executed after the completion of the training runs, use the determine calibration parameters to estimate the quality of the results from the optimization model. The generating/solving of the optimization models is repeated for multiple test runs. That is, the test runs, which are executed after the completion of the training runs, use the determined calibration parameters and estimated quality to generate data (model predictions) which are in turn presented to the user (e.g., human or system), along with actual plant values, so that the user may judge the quality of the calibrated model.

Build Feed-Estimator

The method 600, at step 640, builds a feed-estimator in the unit process model. In some embodiments, a feed-estimator builder component of the model calibrator 150 may execute step 640. The method 600 (step 640) builds the feed estimator to estimate the compositions of the feed streams entering the physical operating unit (being modeled by the unit process model) at the plant. The method 600 (step 640) uses the reconciled unit process model (output from 630-635) to generate a feed-estimator dataset that is used to build the feed estimator. To generate the feed estimator dataset, the method 600 (step 640) uses: (i) the feed composition range for each key operating unit component, as determined in step 610, and (ii) the range for each MVs of the operating unit over the calibrated time horizon, as determined in step 620.

Step 640 of method 600 combines two algorithms (Sobol Sequences and Random Forest) in a novel way. First, the method 600 (step 640) generates a normalized set of unstructured sampling points via the Sobol Sequence Generator algorithm for a multidimensional unit cube with low discrepancy Sobol numbers, see, e.g., S. Joe and F. Y. Kuo, *Remark on Algorithm* 659: *Implementing Sobol's quasirandom sequence generator*, ACM Trans. Math. Softw. 29, 49-57 (2003), herein incorporated by reference in its entirety. Further, see, e.g., http.//web.maths.unsw.edu.au/~fkuo/sobol/ (2010), herein incorporated by reference in its entirety, where the cube dimensions are comprised of the feed composition variables and MVs. Embodiments of method 600 (step 640) provide an optimal or nearly optimal placement of sampling points by the Sobol Sequence Generator algorithm, irrespective of the number of points chosen.

The method 600 (step 640) then uses the set of input values to solve the reconciled unit process (first-principle) model generated in steps 630-635. The method 600 (step 640) uses each operating point of the above generated Sobol Sequence as input values to solve a different instance of the reconciled unit process (first-principle) model to generated in steps 630-635 to collect a set of process model predicted output variables (OV) data, where the OVs correspond to model predictions of plant measurements which are mapped by the user. These sets of input values and output values, in aggregate, comprise the feed estimator dataset, which are used to build the Random Forest feed estimator model for the unit process model. The method 600, at step 645, further estimates feed compositions of the modeled operating unit using the feed-estimator dataset.

To build the Random Forest feed estimator model, the method 600 (step 465) calls the Random Forest Regressor, see, e.g., http://scikit-learn.org/stable/modules/generated/sklearn.ensemble.RandomForestRegressor.html (2010), herein incorporated by reference in its entirety. The method 600 may compute parameters of the random forest algorithm, e.g., as shown in scikit-learn: machine learning in python, http://dl.acm.org/citation.cfm?id=2078195 (2011), herein incorporated by reference in its entirety, where the input for Random Forest Regressor is the manipulated (MVs) and output variables (OVs) from the process unit operation model. Using these computed parameters, method 600 (step 645) executes the random forest algorithm to estimate the feed compositions of the unit process model based on measurements read at the physical operating unit. In this regard, the method 600 essentially performs an inverse function to the reconciled unit process (first-principles) model generated at steps 630-635 over a space that is spanned by low discrepancy Sobol numbers. The method 600 uses the estimated feed compositions to update the created dataset from step 625. The method 600, at step 560, determines that the reconciliation results are not yet stable, and using the updated dataset, repeats steps 630-645 until the reconciliations results are stable. Once the method 600 (step 645, 560) determines that the reconciliation results are stable, the method 600 proceeds to step 650.

In some embodiments, a feed-estimator builder may encounter a feed composition where the available temperature/pressure/analyzer sensors in a distillation column that are directly affected by changes in the feed composition are smaller than the number of feed components to be estimated. In this situation, the method 600 (step 645) lumps similar feed components before conducting feed estimation. The lumping approach conducts a principal component analytics (PCA) on the sensitivity matrix from the calibrated unit process model that contains the partial derivatives of the sensor values with respect to the feed component values. The distance between the feed components in the PCA analysis provides a quantitative assessment of the degree of similarity. If two feed components are very similar, these components should be lumped. Once the lumping is complete, the feed estimation process can be conducted. Once the feed estimation process is complete in terms of the lumped feed components, the components must be de-lumped in the same ratios as originally provided in the unit process model.

Hydraulic Model Tuning

Figure 6C:
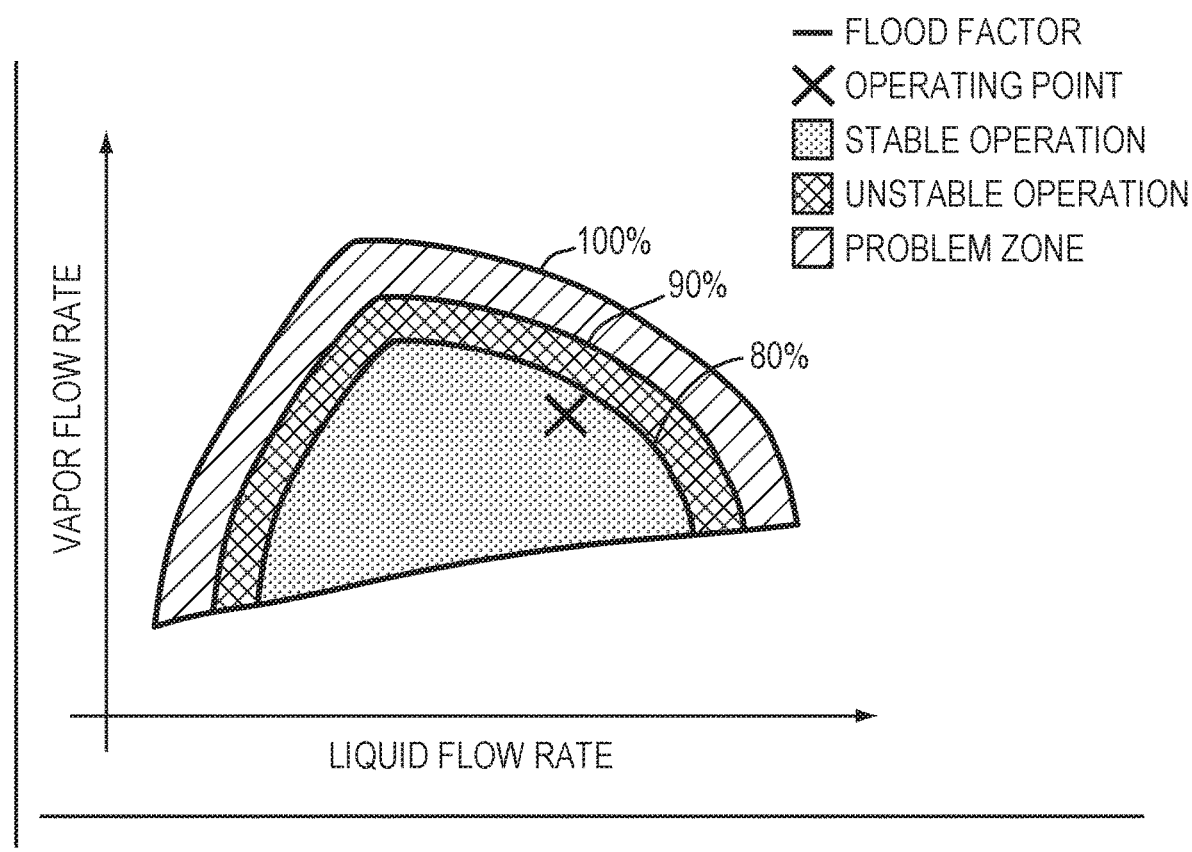
FIG. 6C is a graphical representation (stability diagram) of column operating zones utilized in the method of FIG. 6A in embodiments of the present invention.

For a unit process model representing a distillation column operating unit, the method 600, at step 650, also tunes the hydraulic model of the unit process model. In some embodiments, a hydraulic model tuner component of the model calibrator 150 may execute step 650. The hydraulic model represents the liquid and vapor traffic at each stage of the distillation column. The hydraulic model (as part of the unit process model) is used by the unit process model to determine whether a distillation column is experiencing operating problems, such as entrainment, flooding, or weeping. The stability of the column operation with respect to flooding risk can be quantified through well-established flooding correlations (see, e.g., H. Z. Kister and J. R. Haas, Chem. Eng. Prog., 86(9), page 63 (1990) and J. R Fair. Petro/Chem Eng., 33(10), page 45 (1961), which are herein incorporated by reference in their entirety). These correlations compute a flooding factor (FF) from operation variables (e.g. tray vapor and liquid flow rates) and parameters (e.g. system foaming factor). Based on the calculated values of the hydraulic model flooding factor, the operating region for the distillation column can be divided into three primary zones: a zone of stable operation (FF<80%), a zone of unstable operation (80%≤FF<90%), and a problem zone (in which operating problems are encountered, FF>90%), as shown in FIG. 6C. The liquid and vapor flows of a given stage in the distillation column indicate in which of the three zones a given stage of the column is operating.

The hydraulic model includes a number of adjustable parameters (i.e. system foaming factor) and the method 600 (step 650) tunes the hydraulic model via parameter adjustment. The method 600 (step 650) tunes the hydraulic model by calculating values for the adjustable parameters of the hydraulic model, such as the system foaming factor. The method 600 (step 650) calculates values for the adjustable parameters that enable the hydraulic model to accurately predict the zone in which a given stage within the distillation column is operating.

The following are example steps performed by the method 600 (step 650) for tuning a hydraulic model of the unit process model that represents a distillation column consisting of either trays or packing. First, for each point in the created dataset from step 625, the method 600 (step 650) calculates the column profile using the reconciled unit process (first-principles) model output from steps 630 and 635. Next, the method 600 (step 650) identifies the maximum column pressure drop value and corresponding flood percentage value over the calibration time horizon. In some embodiments, these values are configured by a user via the user interface 110. In other embodiments, these values are calculated as estimates by the reconciled unit process (first-principles) model output from steps 630 and 635.

The method 600 (step 650) then determines a virtual operating point for the hydraulic model based on the maximum column pressure drop. The method 600 (step 650) calculates the virtual operating point as follows. First, the method 600 (step 650) uses a least squares regression to equate the column pressure drop to the square of tray vapor flow rate. This results in obtaining the following equation: $DP=aV^2+b$, where DP is the column pressure drop, V is the tray vapor flow rate, and a and b are parameters determined by the linear regression. Second, the method 600 (step 650) uses the obtained equation, and the maximum column pressure drop configured by the user via the user interface 110, to calculate a corresponding maximum value of V. Third, the method 600 (step 650) uses the model calculated ratio of vapor flow rate to liquid flow rate, which is obtained from the model output of steps 630 and 635, and assuming that vapor to liquid flow rate ratio (V/L) is constant, computes a maximum liquid flow rate ($L_{max}$). Fourth, the method 600 (step 650) then, utilizes the hydraulic correlations from the hydraulic model, manipulates the hydraulic model parameters (e.g. system foaming factor, and such) so that the operating point, ($L_{max}$, $V_{max}$), has a flooding factor value equivalent to the user specified flood factor (configured via the user interface 110).

The method 600 adjusts the hydraulic model parameters (e.g., system foaming factor) based on a flooding curve of the distillation column (or other such representation), as shown in FIG. 6C, until the identified flood percentage value intersects with the determined virtual operating point and all the points in the created dataset from step 625 fall within the zone of stable operation. In this manner, the method 600 calculates (tunes) the stable operation, unstable operation, and runaway flooding zones of the hydraulic model.

The method 600, step 655, then saves the calibration results (from steps 610-650) into a process unit configuration file in memory on the plant network 120 (e.g., in the centralized data store 130). The method 600 of calibrating the unit process model ends at step 655. At the completion of method 600, the unit process (first-principles) model is configured for online use (real-time monitoring and predicting of plant operations) driven by physical plant measurements.

Method of Deploying Unit Process Model

Figure 7:
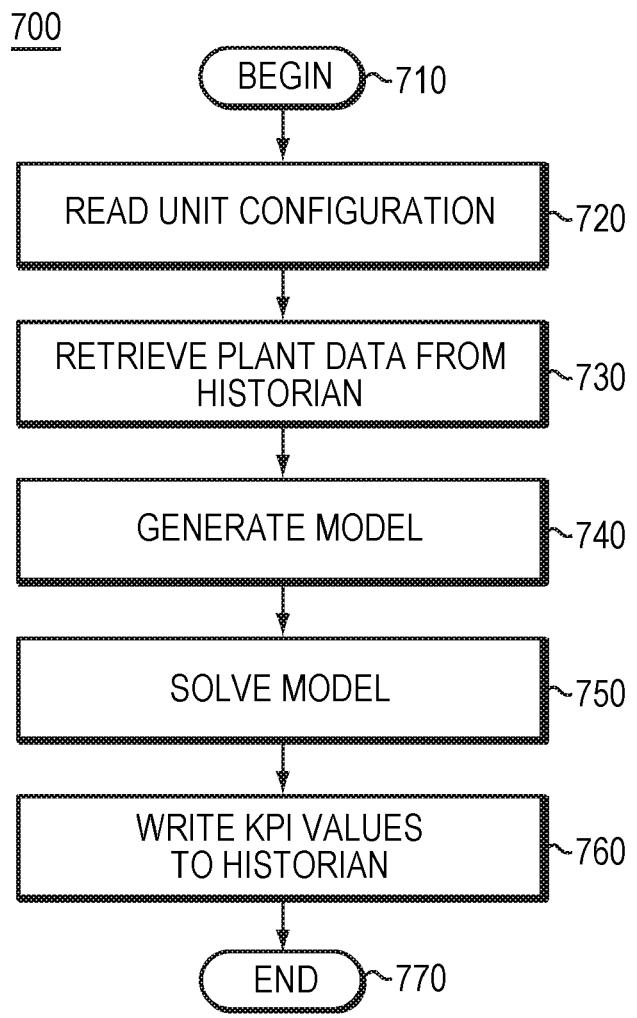
FIG. 7 is a flow diagram depicting a method of deploying a unit process model in embodiments of the present invention and employed by the deployment module of FIG. 1.

FIG. 7 is a flow diagram depicting a computer-implemented method 700 of deploying a unit process model in embodiments of the present invention, for example by deployment module 160 as implemented. The method 700 begins at step 710. The method 700, at step 720, reads the configuration file storing the calibrated unit process model, and associates the configuration file with real-time plant data to dynamically execute the model online. In some embodiments, the configuration file was retrieved as the saved configured file generated by the build method 500 and calibration method 600. The method 700 (step 720), first connects the variables in the unit process model to their respective mapped instrument tags (as provided in steps 560-570 of FIG. 5). The method 700, at step 730, next retrieves measured plant data from the real-time plant historian, which may be located at the centralized plant data store 130, and conditions (i.e., interpolates and averages) the retrieved data. The measured plant data corresponds to the mapped instrument tags from method 500, steps 560-570.

The method 700, at step 740, then generates a dynamically executable version of the online unit process model. To do so, the method 700 (step 740) creates a block of variables (a measurement block) for each mapped instrument tag, and uses the variable block to link the measured plant data for the mapped instruments to calculations by the model for the mapped instruments. Each measurement block provides three variables: a variable to hold the measured value of the real-time plant data, a variable to hold the model calculated result, and a variable that represents the difference or offset between the measured plant value and model calculated value. The offsets for a subset of the measurement blocks are used as tuning factors to ensure the model closely mirrors the actual (physical) operations in the plant. For each material stream out of the unit, the method 700 (step 740) also creates an analyzer block to systematize the bookkeeping of stream variables of the modeled operating unit. The method 700 may further create one or more calculator blocks to expand the scope of the unit process model beyond what is integral to the model.

The calculator blocks are utilized by the method 700 (step 740) for the following example functions. First, the method 700 utilizes the calculator blocks as an algebraic combination of process variables (e.g., computing a combined stream flow rate as the sum of stream flow rates that exist in the physical plant, calculating the pressure drop across the column from the top and bottom tray values, and such). The method 700 also utilizes the calculator blocks for basis conversion of process variables (e.g., converting a concentration variable from molar to mass, and such). The method 700 further utilizes the calculator blocks for setting model variables to be consistent with plant measurements (e.g., setting the model feed flow rate to match the value observed in the plant, and such).

To generate the dynamically executable version of the online unit process model, the method 700, at step 740, next sets the correct specifications for the variables of the model, so that the model is square (i.e., number of equations equals the number of unknown variables). The method 700 (step 740) then retrieves the real-time values of the plant data from the real-time plant historian to correctly set the fixed variables (i.e., MVs) of the model. The method 700 (step 740) further sets the values of the calibration parameters of the model determined via execution of method 600 (i.e., calibrated parameters from the flow and temperature steps 635 and 640 of FIG. 6A). The method 700 (step 740) also sets the solver parameters to values (e.g., default values) conducive to quick solution. The method 700 (step 740) then determines if the unit is at steady-steady state and estimates the compositions of the feed stock (using feed stock estimator of step 640) to complete the dynamically executable version of the online unit process model. The method 700 considers the modeled unit to be at steady-state if its current mass balance error is within a steady-state band defined by the mass balance average and deviation observed during calibration (as described in reference to method 600).

Using the retrieved and conditioned data from step 730, the method 700, step 750, solves the dynamically executable version of the online unit process model to compute values for KPIs of interest for the operating unit. The computed values for the KPIs of interest may include one process variable measurement (e.g., product impurities, condenser/reboiler duties, and such), a calculated index from measurements of one or more process variables using a pre-defined formula (e.g., tray index corresponding to the column tray that has the highest computed flood factor), and the like. See U.S. patent application Ser. No. 15/141,701, herein incorporated by reference in its entirety, for examples of computing KPI values.

The method 700, step 760, writes the computed KPI values to a real-time plant historian, which may be located a centralized data store 130 or other location on the plant network 120. From the real-time plant historian, plant systems (e.g., instrumentation, control, and operation computer 175 of FIG. 1) and plant personnel (e.g., plant operators) may access and employ the KPI values to perform real-time performance monitoring and predictive analytics (e.g., informing the user via interface 110 of an incipient flooding event for a distillation column) on the operations of the modeled operating unit. If the operating unit modeled by the unit process model is a distillation column, the method also predicts the column hydraulics (e.g., using hydraulic model tuned in step 650) and generate a stability diagram for execution of the unit process model. The method 700 ends at step 770.

Generating a Rule Engine

A rule engine may be generated for predictive insight and prescriptive guidance in embodiments of the present invention. A rule engine refers to a combination of one or more models in conjunction with domain specific logic. For example, the rule engine may receive as input a possible combination of user input (e.g., via a user interface as shown in FIG. 8B), first principles model predictions (which, in some embodiments, are calculated by models generated by method 500) and plant tag data. The rule engine may be utilized to predict a multitude of events, including types of events comprising: (i) discrepancies between plant measurements taken by physical instruments and first principles model predictions and (ii) imminent undesirable operating events. Based on a predicted event, the rule engine can issue an alert of the event, as well as, suggestions for corrective actions. The former example event type (i.e., discrepancies between plant measurements and first principle model predictions) can be utilized to inform the user that the first principles model is no longer properly calibrated for the current asset operation or that drifts in the physical instruments may be occurring, indicating the need for re-calibration of the physical instruments.

For a distillation column, a specific embodiment of the latter example event type (i.e., imminent undesirable operating events) is column flooding. Flooding is defined as "the excessive accumulation of liquid inside the [distillation] column" (see, e.g., Kister et al., "*Distillation Operation (Mechanical-Engineering)*, Book-mart Press, Inc., pg. 376 (1990), herein incorporated by reference in its entirety). The symptoms of flooding can include undesirable operating conditions that include loss of separation, which can be detected by rises in impurities as well as decreases in column tray temperature differentials. The symptoms of flooding may also include excessive pressure drop across the column or section of the column and sharp rises in column differential pressure. The loss of column separation due to column flooding can result in the production of off-specification materials, motivating the need to predict the onset of flooding and provide prescriptive guidance to avoid a flooding scenario. The rule engine facilitates notifying the user of a column flooding event type based on these symptoms.

Figure 8A:
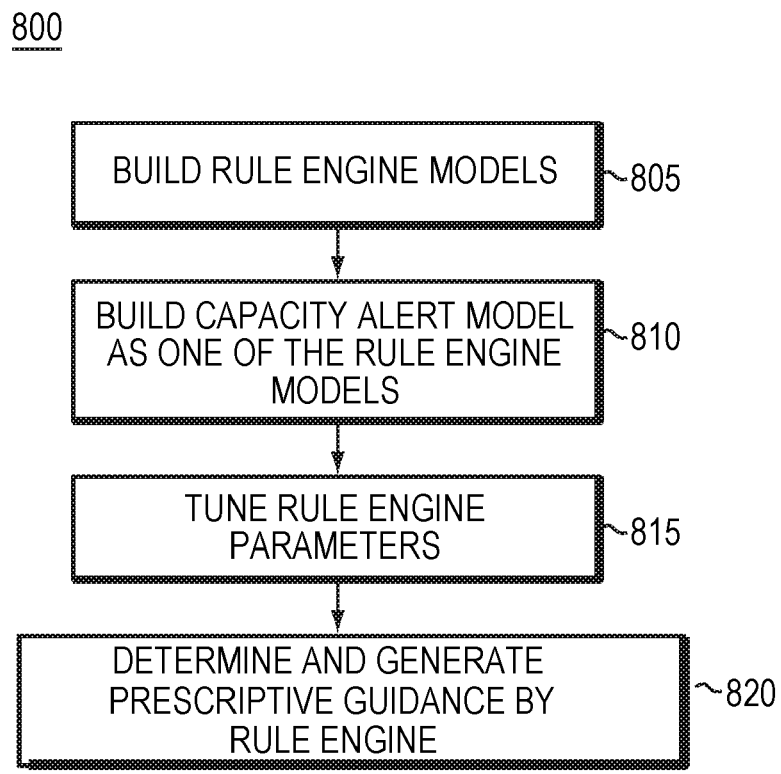
FIG. 8A is a flow diagram depicting a method of generating a rule engine used in embodiments of the present invention.
Figure 8B:
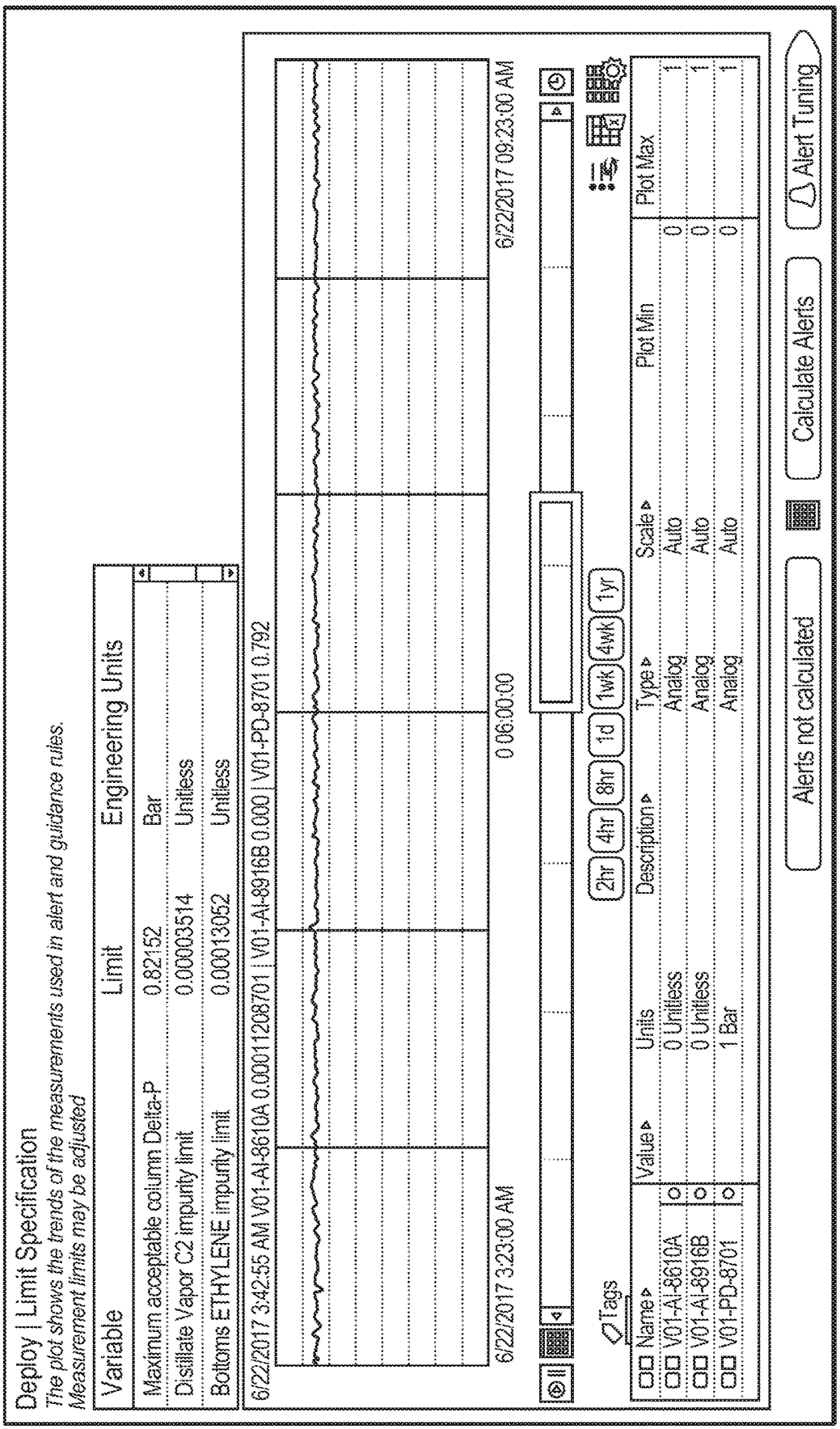
FIG. 8B is a schematic view of a user interface of a rule engine in embodiments of the present invention.

FIG. 8A is a flow diagram depicting a computer-implemented method of generating a rule engine for prescriptive guidance in embodiments of the present invention. The method 800, at step 805, builds the rule engine composed of one or more black-box (non-first principles) models (also referred to as alert models) which generate one or more alert scores that are consumed by the rule engine. The method 800 (step 805) builds the alert models to receive model inputs that may include user input, first principles model predictions (in some embodiments calculated by models generated in method 500), and plant tag data to generate the one or more alert scores. In some embodiments, the alert models calculate the one or more alert scores by utilizing the following functional form, where each model input i has its own coefficient, constant, and exponent rule engine parameters.

If $min_i <= (X_i - Constant_i) <= max_i$:

Score=$Sum(Coeff_i * (X_i - Constant_i)^{Exponent_i})$

Else:

Score=0

The rule engine, once built, examines each of the generated one or more alert scores to determine if the respective alert score crosses an alert threshold value. If an alert score crosses an alert threshold, then the rule engine may execute a series of events, including the prompting of an alert to the user via the user interface of FIG. 8B, as well as, calculation of prescriptive guidance presented to the user.

The method 800, at step 810, builds a capacity alert model as one of the alert (black-box) models of the rule engine. The alert models that generate alert scores for the rule engine may be general for use respective to many process units 180 (e.g., models that generate alert scores for instrumentation error) or specific for use respective to a particular unit 180 operation type. An alert model specific to a particular unit operation may be constructed from domain knowledge. An example alert specific to a distillation column is a capacity alert which can be used to warn a user of an incipient flooding event. The method 800 (step 810) builds a capacity alert model (that generates a capacity alert score) based on various model inputs. First, method 800 (step 805) may build the capacity alert model based on prediction by a first principles model of the column flooding factor at one or more specified trays of the distillation column. A high prediction value indicates an increased probability of column flooding, as further described in the above "Hydraulic Model Tuning" section. The method 800 (steps 805 and 810) may obtain the prediction of the first principles model by use of the calibrated model built by method 500 of FIG. 5.

Second, method 800 (step 810) may build the capacity alert model based on quantification of the resemblance of a sharp rising behavior in one or more column section differential pressures measured at the plant over time. Third, method 800 (step 810) may build the capacity alert model based on quantification of the resemblance of a falling behavior in one or more column section differential temperatures (DTs) measured at the plant over time. The method 800 (step 810) may obtain these quantifications (sharp rising and falling behavior) through various techniques, including by using trending, which performs linear regression of time series data to obtain the best-fit slope of the data as a function of time. The method 800 (step 810) may also obtain these quantifications (sharp rising and falling behavior) using pattern recognition through applying a dynamic time warping algorithm to quantify how closely a section of time series data matches a pre-specified pattern (see, e.g., Rakthanmanon, *Searching and Mining Trillions of Time Series Subsequences under Dynamic Time Warping*, 18$^{th}$ ACM SIGKDD Converence on Knowledge discovery and Data Mining, Aug. 12-16, 2010, herein incorporated by reference in its entirety). Fourth, method 800 (step 810) may build the capacity alert model based on current value of one or more column section differential pressures (DPs) measured at the plant.

The method 800, at step 815, tunes the parameters of the rule engine. The ability of the rule engine to predict undesirable events associated with a unit operation requires appropriate determination of the parameters for the rule engine models (e.g., alert models). The method 800, step 815, uses the approach of heuristics to tune the rule engine model parameters. In the case of a capacity alert model for a distillation column, the method 800 (step 815) enables users to provide operational context (normal or flooding). The method 800 (step 815) then calculates rule engine model parameters (alert parameters) that provide the best probability of alerting the user that a flooding event may occur during incipient flood. The method 800 (step 815) tunes the alert parameters using two components: an objective function and a solver that is capable of minimizing the objective function. The objective function being defined (by a human user or computer-implemented system) with multiple objectives as follows. First, the objective function is defined to prevent the model alert score from crossing the alerting threshold during normal operation (i.e., prevent a false positive). Second, the objective function is defined to ensure that the model alert score crosses the alerting threshold during abnormal operation windows. Third, the objective function is defined to create separation between the mean values of the model scores between normal and abnormal time windows.

The method 800, at step 820, determines prescriptive guidance from execution of the rule engine built and tuned in steps 805-815. When the rule engine determines that an alert score threshold is not met, the rule engine executes logic (based upon provided domain knowledge) to provide a user with prescriptive guidance in the form of an actionable item. In the example of a capacity alert model for a distillation column, upon an alert triggering, the rule engine considers at least the following actionable items: (1) reduction of column reflux flow rate and (2) reduction of feed flow rate for one or more feed streams.

The rule engine applies criteria for determining the prescriptive guidance in response to not meeting the alert score threshold. In the example of the capacity alert model, the rule engine applies impurity specification limits provided by a user (e.g., via the user interface screen of FIG. 8B), along with predictions by a first principles model about the sensitivity of the column product impurities in regard to flow rates of column reflux and one or more feed streams, to current product stream impurity levels. For example, the rule engine determines if the current product stream impurity levels violate the user specified limit. The rule engine also determines if the first principle model (in some embodiments generated by method 600) predicts an impurity specification violation based on a differential move in the reflux flow rate (size of move may be a configurable parameter in the user interface of FIG. 8B). If the rule engine determines a violation, the rule engine provides prescriptive guidance (e.g., via the user interface screen of FIG. 8B) advising the user to reduce the one or more feed flow rates, instead of reducing the distillation column reflux rate.

Digital Processing Environment

Figure 9:
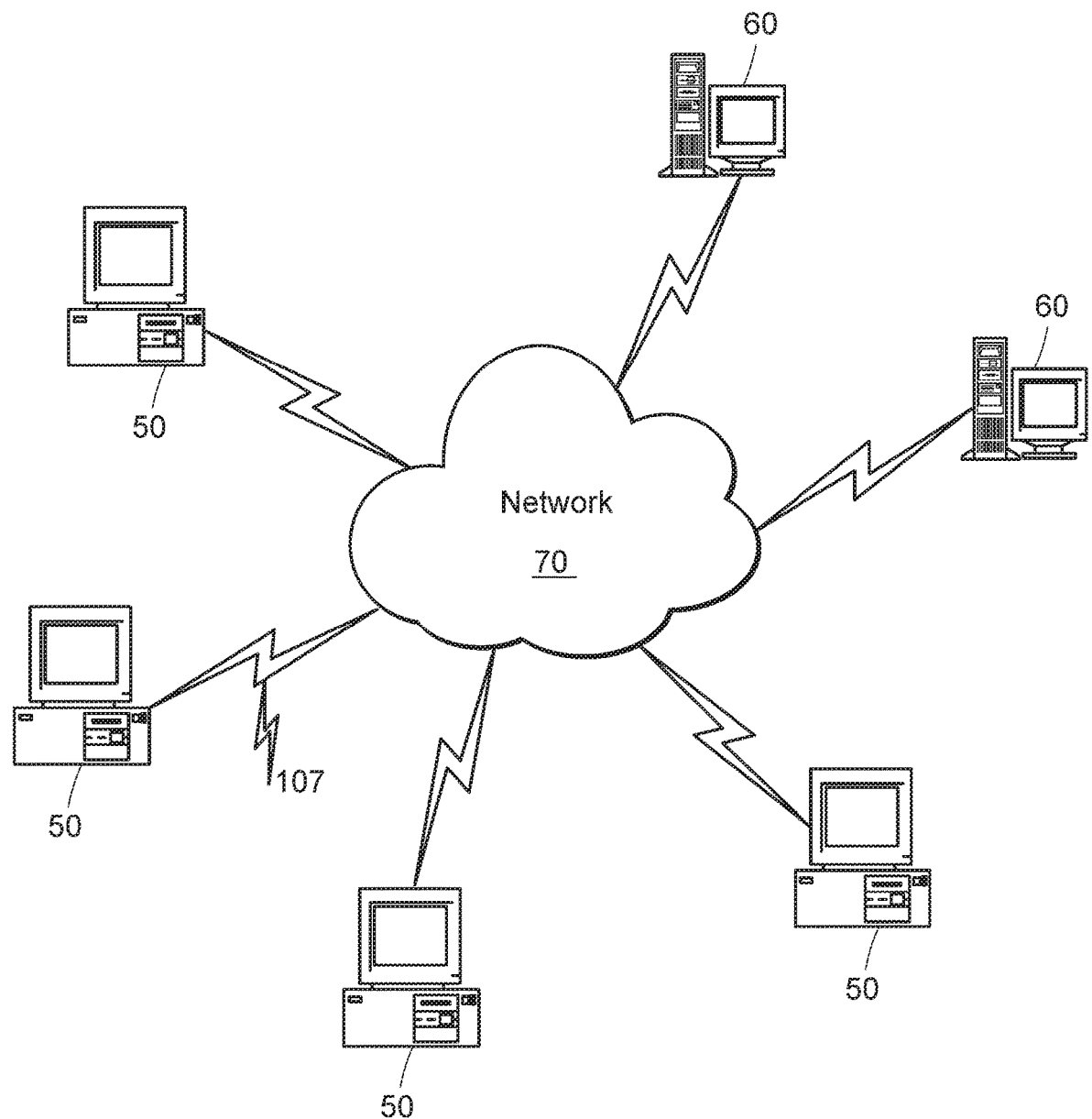
FIG. 9 is a schematic view of a computer network in which embodiments of the present invention are implemented.

FIG. 9 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 10:
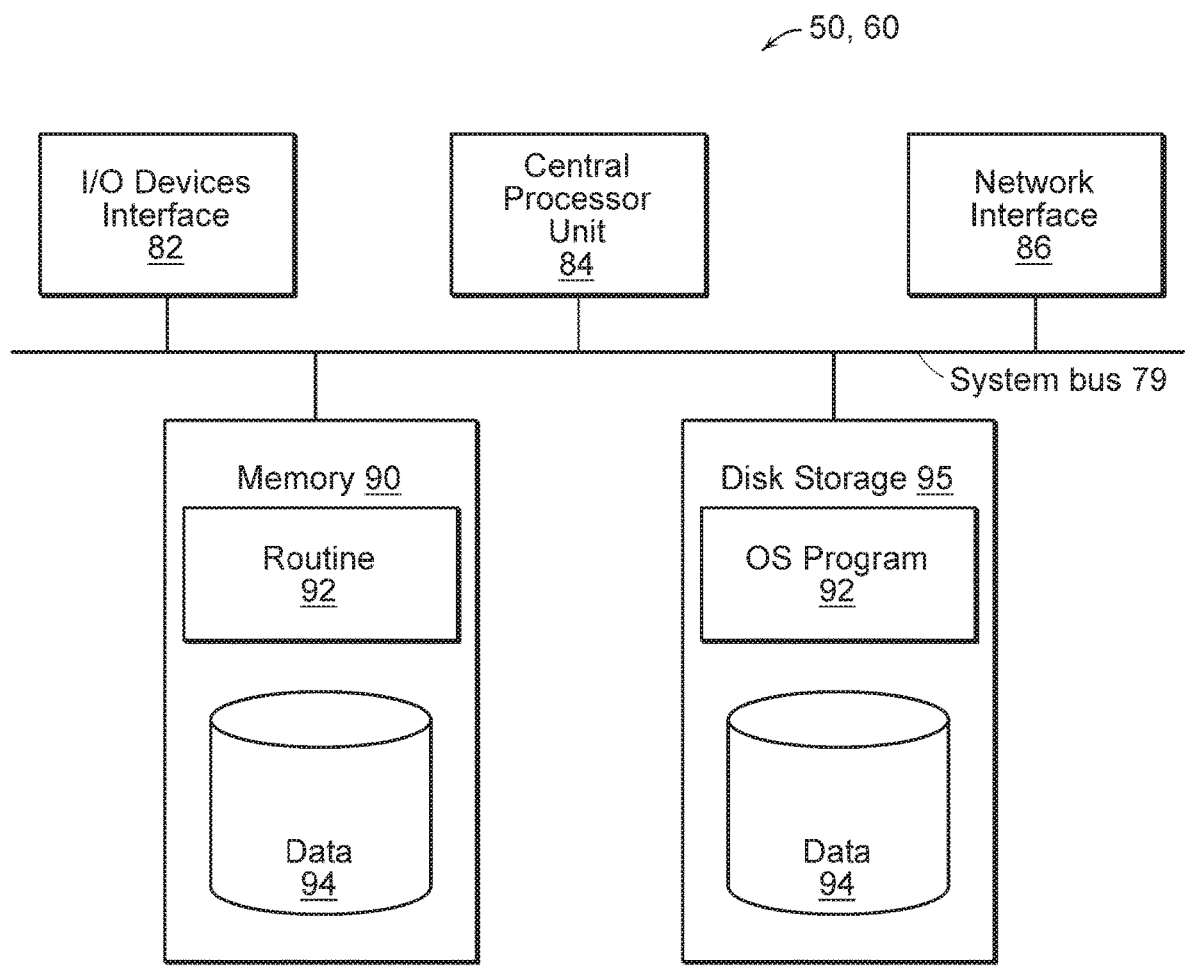
FIG. 10 is a block diagram of a computer node or device in the network of FIG. 9.

FIG. 10 is a diagram of the internal structure of a computer (e.g., client processor/device 50 or server computers 60) in the computer system of FIG. 9. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 9). Memory 90 provides volatile storage for computer software instructions 92 and data 94 used to implement an embodiment of the present invention (e.g., user interface and working procedure code 100, 200, 300, 400, 500, 600, 700, 800 detailed above in FIGS. 1-8B). Disk storage 95 provides non-volatile storage for computer software instructions 92 and data 94 used to implement an embodiment of the present invention. Data 94 may include the off-line model, the process model flowsheet, the data historian entries/tags/mappings, the first-principles model, associated reconciliation dataset, hydraulic model, rule engine, and so forth as previously discussed. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so called Software as a Service (SaaS), or other installation or communication supporting end-users.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of generating an online unit process model, the method comprising:

identifying a plant-wide process model of an industrial plant, the plant-wide process model being developed and configured to singularly perform offline operations of the industrial plant;

selecting a modeled operating unit contained in the identified plant-wide process model, the selected modeled operating unit corresponding to a physical operating unit at the industrial plant;

converting the identified plant-wide process model to a unit process model of the selected modeled operating unit, the unit process model being configured to singularly perform offline operations of the selected modeled operation unit and being distinct from the identified plant-wide process model;

recalibrating the unit process model, from being configured to singularly perform offline operations, to enable online performance based on real-time measurements collected by instruments of the physical operating unit;

deploying the recalibrated unit process model online at the industrial plant, the deployed unit process model calculating KPIs based on real-time measurements collected by the instruments of the physical operating unit, the KPIs predicting operational behavior of the physical operating unit at the industrial plant; and controlling the physical operating unit according to the predicted operational behavior of the physical operating unit.

2. The method of claim 1, wherein the plant-wide process model is a first-principles model, and the unit process model resulting from the converting and recalibrating is a first-principles models.

3. The method of claim 1, wherein the operating unit is a distillation column.

4. The method of claim 1, wherein converting the identified plant-wide process model comprises:
removing variables and equations unrelated to the selected modeled operating unit;
replacing specifications of the selected modeled operating unit with standard specifications for the selected modeled operation unit;
converting calculation basis to a standard form for the selected modeled operation unit;
reconfiguring process variables of the selected modeled operating unit; and
defining control loops of the selected modeled operating unit, the defined control loops identifying operating objectives of the selected modeled operating unit.

5. The method of claim 4, wherein reconfiguring the process variables comprises:
identifying manipulated variables and output variables of the selected modeled operating unit; and
mapping each identified manipulated variable and output variable to at least one instrument tag.

6. The method of claim 1, wherein recalibrating the unit process model comprises:
creating a dataset based on plant data retrieved from a real-time plant historian, the created dataset comprising a subset of the plant data collected at steady-state during a calibrated time horizon;
reconciling modeled flow in the unit process model, the reconciling enables the unit process model to perform using measurements collected by physical flow instruments at the industrial plant;
reconciling modeled temperature in the unit process model, the reconciling enables the unit process model to perform using measurements collected by physical flow instruments at the industrial plant;
building a feed estimator that enables the unit process model to estimate compositions of feed streams entering the selected modeled operating unit; and
if the selected modeled operating unit is a distillation column, tuning a hydraulic model that represents internal liquid and vapor traffic flow of the distillation column in the unit process model.

7. The method of claim 6, wherein reconciling modeled flow or model temperature further comprises:
selecting expected errors in the respective physical instruments;
dividing the plant data of the dataset into a training set and a test set;
generating optimization models for each data point in the training set, wherein solving the optimization models to determine calibration parameters for the modeled flow or modeled temperature; and
generating simulation models for each data point in the test set, wherein solving the simulation models to determine quality of the determined calibration parameters.

8. The method of claim 7, wherein the calibration parameters for the modeled flow are flow offsets that represent difference between measured flow by the physical flow instrument and flow calculated by the unit process model.

9. The method of claim 7, wherein the calibration parameters for the modeled temperature comprise:
an efficiency parameter that represents degree of separation between measured temperature by the physical temperature instrument and temperature calculated by the unit process model; and
an aeration parameter that represents whether measured pressure drop across the physical operating unit matches pressure drop calculated by the unit process unit.

10. The method of claim 1, wherein the deploying of the recalibrated unit process model online at the industrial plant further comprises:
generating dynamically executable version of the unit process model, the generating includes creating variables that link real-time measurements by the instruments of the physical operating unit to corresponding values calculated by the unit process model;
retrieving real-time measurements of the physical operating unit, the retrieving setting linked variables associated with real-time measurements in the model;
solving the dynamically executable version of the unit process model, the solving setting linked variables associated of calculated model values and determining values for KPIs of the modeled operating unit; and
writing the determined KPIs to a real-time historian for access by plant computers configured to predict and control the physical operating unit based on the KPIs.

11. The method of claim 1, further comprising applying the recalibrated unit process model to generate a rule engine that automates providing to a user prescriptive guidance on an event of the physical operating unit.

12. A computer system for generating an online unit process model, the system comprising:
a processor; and
a memory with computer code instructions stored thereon, the memory operatively coupled to the processor such that, when executed by the processor, the computer code instructions cause the computer system to implement:
a) a model converter configured to:
obtain a plant-wide process model of an industrial plant, the plant-wide process model being developed and configured to singularly perform offline operations of the industrial plant;
select a modeled operating unit contained in the obtained plant-wide process model, the selected modeled operating unit corresponding to a physical operating unit at the industrial plant; and
converting the obtained plant-wide process model to a unit process model of the selected modeled operating unit, the unit process model being configured to singularly perform offline operations of the selected modeled operation unit and being distinct from the identified plant-wide process model;
b) a model calibrator, responsive to the model converter, and configured to recalibrate the unit process model, from being configured to singularly perform offline operations, to enable online performance based on real-time measurements collected by instruments of the physical operating unit; and
c) a deployment engine coupled to deploy the recalibrated unit process model online at the industrial plant, the deployed unit process model calculating KPIs based on real-time measurements collected by the instruments of the physical operating unit, the KPIs predicting operational behavior of the physical operating unit at the industrial plant; and the deployment engine being in communication with a control system configured to control the physical operating unit according to the predicted operational behavior of the physical operating unit.

13. The computer system of claim 12, wherein the obtained plant-wide process model and the recalibrated unit process model are first-principles models.

14. The computer system of claim 12, wherein the operating unit is a distillation column.

15. The computer system of claim 12, wherein the model converter is further configured to convert the plant-wide process by:

removing variables and equations unrelated to the selected modeled operating unit;

replacing specifications of the selected modeled operating unit with standard specifications for the selected modeled operating unit;

converting calculation basis to a standard form for the selected modeled operation unit;

reconfiguring process variables of the selected modeled operating unit; and defining control loops of the selected modeled operating unit, the defined control loops identifying operating objectives of the selected modeled operating unit.

16. The computer system of claim 15, wherein the model converter is further configured to reconfigure the process variables by:

identifying manipulated variables and output variables of the selected modeled operating unit; and mapping each identified manipulated variable and output variable to at least one instrument tag.

17. The computer system of claim 12, wherein the model calibrator comprises:

a dataset creator configured to create a dataset based on plant data retrieved from a real-time plant historian, the created dataset comprising a subset of the plant data collected at steady-state during a calibrated time horizon;

a flow reconciliation module configured to reconcile modeled flow in the unit process model, the reconciling enables the unit process model to perform using measurements collected by physical flow instruments at the industrial plant;

a temperature reconciliation module configured to reconcile modeled temperature in the unit process model, the reconciling enables the unit process model to perform using measurements collected by physical flow instruments at the industrial plant;

a feed-estimator builder configured to build a feed estimator that enables the unit process model to estimate compositions of feed streams entering the selected modeled operating unit; and if the selected modeled operating unit is a distillation column, a hydraulic model tuner configured to tune a hydraulic model that represents internal liquid and vapor traffic flow of the distillation column in the unit process model.

18. The computer system of claim 17, wherein the flow reconciliation module and the temperature reconciliation module are further configured to:

select expected errors in the respective physical instruments;

divide the plant data of the dataset into a training set and a test set;

generate optimization models for each data point in the training set, wherein solving the optimization models to determine calibration parameters for the modeled flow or modeled temperature; and generate simulation models for each data point in the test set, wherein solving the simulation models to determine quality of the determined calibration parameters.

19. The computer system of claim 18, wherein the calibration parameters:

for the modeled flow are flow offsets that represent difference between measured flow by the physical flow instrument and flow calculated by the unit process model; and for the modeled temperature are:

an efficiency parameter that represents degree of separation between measured temperature by the physical temperature instrument and temperature calculated by the unit process model; and an aeration parameter that represents whether measured pressure drop across the physical operating unit matches pressure drop calculated by the unit process unit.

20. The computer system of claim 12, wherein the deployment module is further configured to:

generate dynamically executable version of the unit process model, the generating includes creating variables that link real-time measurements by the instruments of the physical operating unit to corresponding values calculated by the unit process model;

retrieve real-time measurements of the physical operating unit, the retrieving setting linked variables associated with real-time measurements in the model;

solve the dynamically executable version of the unit process model, the solving setting linked variables associated of calculated model values and determining values for KPIs of the modeled operating unit; and write the determined KPIs to a real-time historian for access by plant computers configured to predict and control the physical operating unit based on the KPIs.

21. The computer system of claim 12, wherein the deployment module further applies the recalibrated unit process model and generates a rule engine that automates providing to a user prescriptive guidance on an event of the physical operating unit.

22. A computer program product comprising:

a non-transitory computer-readable storage medium having code instructions stored thereon, the storage medium operatively coupled to a processor, such that, when executed by the processor for generating an online unit process model, the computer code instructions cause the processor to:

obtain a plant-wide process model of an industrial plant, the plant-wide process model being developed and configured to singularly perform offline operations of the industrial plant;

select a modeled operating unit contained in the obtained plant-wide process model, the selected modeled operating unit corresponding to a physical operating unit at the industrial plant;

convert the obtained plant-wide process model to a first-principles unit process model of the selected modeled operating unit configured to singularly perform offline operations of the selected modeled operation unit, and the first-principles unit process model being distinct from the identified plant-wide process model;

recalibrate the unit process model, configured to singularly perform offline operations, to enable online performance based on real-time measurements collected by instruments of the physical operating unit, resulting in a recalibrated first-principles unit process model;

deploy the recalibrated, first-principles unit process model online at the industrial plant, the deployed unit process model calculating KPIs based on real-time measurements collected by the instruments of the physical operating unit, the KPIs predicting operational behavior of the physical operating unit at the industrial plant; and control the physical operating unit according to the predicted operational behavior of the physical operating unit.

* * * * *